United States Patent
Jorgovanovic et al.

(10) Patent No.: US 12,160,699 B2
(45) Date of Patent: *Dec. 3, 2024

(54) TWO-WAY WIRELESS HEADPHONES

(71) Applicant: Amazon Technologies, Inc., Seattle, WA (US)

(72) Inventors: Milos Jorgovanovic, Mountain View, CA (US); Hans Edward Birch-Jensen, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/473,650

(22) Filed: Sep. 13, 2021

(65) Prior Publication Data

US 2021/0409861 A1    Dec. 30, 2021

Related U.S. Application Data

(63) Continuation of application No. 16/249,100, filed on Jan. 16, 2019, now Pat. No. 11,153,678.

(51) Int. Cl.
*H04R 1/10* (2006.01)
*H04W 76/14* (2018.01)

(52) U.S. Cl.
CPC .......... *H04R 1/1091* (2013.01); *H04W 76/14* (2018.02); *H04R 2420/07* (2013.01)

(58) Field of Classification Search
CPC ... G10L 15/22; G10L 15/26; G10L 2015/221; G10L 15/00; G10L 2015/223; G10L 21/0208; G10L 13/00; G10L 15/063; G10L 15/30; G10L 19/018; H04L 1/00; H04L 25/4908; H04L 4163/0464; H04L 63/083; H04L 63/0846; H04L 63/0861; H04L 63/101; H04L 63/102; H04L 63/12; H04L 63/123; H04L 63/126; H04L 63/168; H04L 63/30; H04L 63/304; H04L 65/1016; H04L 65/1036; H04L 65/1043; H04L 65/1076; H04L 65/1083; H04L 65/1093; H04L 65/1095; H04L 65/1096; H04L 65/1104;

(Continued)

(56) References Cited

U.S. PATENT DOCUMENTS 10,015,664 B2 * 7/2018 Lau .................... H04W 4/18
11,153,678 B1 * 10/2021 Jorgovanovic ........ H04W 76/14

(Continued)

OTHER PUBLICATIONS

Office Action for U.S. Appl. No. 16/249,100, mailed on Jan. 23, 2020, Jorgovanovic, "Two-Way Wireless Headphones," 25 pages.

(Continued)

*Primary Examiner* — Lun-See Lao
(74) *Attorney, Agent, or Firm* — Lee & Hayes, P.C.

(57) ABSTRACT

A method including establishing, at a first wireless audio device, a first communication channel with a second wireless audio device, receiving, at the first wireless audio device, audio data corresponding to a user utterance, determining that the audio data includes a wake word, transmitting at least a portion of the audio data from the first wireless audio device to a mobile device via a second communication channel, receiving an indication to establish a third communication channel with a second wireless audio device, and establishing the third communication channel with the second wireless audio device.

20 Claims, 11 Drawing Sheets

(58) Field of Classification Search
CPC . H04L 65/4025; H04L 65/4038; H04L 65/61; H04L 65/613; H04L 65/756; H04L 65/764; H04L 65/765; H04L 67/00; H04L 67/08; H04L 67/142; H04L 67/148; H04L 67/2876; H04L 67/306; H04L 67/34; H04L 67/53; H04L 67/55; H04L 67/56; H04L 67/59; H04L 67/62; H04L 69/04; H04L 69/162; H04L 69/163; H04L 69/165; H04L 69/22; H04L 9/3226; H04L 9/3236; H04L 9/3247; H04R 1/1041; H04R 2420/07; H04R 1/10; H04R 1/1016; H04R 1/02; H04R 1/1025; H04R 1/1058; H04R 1/1075; H04R 1/22; H04R 1/2826; H04R 1/2857; H04R 1/345; H04R 2201/105; H04R 2201/109; H04R 2420/03; H04R 2460/03; H04R 2460/09; H04R 2460/17; H04R 5/033; H04R 9/025; H04R 9/06; H04R 1/1091; H04R 1/083; H04R 1/1083; H04R 1/46; H04R 2201/107; H04W 4/02; H04W 88/06; H04W 88/02; H04W 68/00; H04W 84/18; H04W 4/029; H04W 4/16; H04W 8/18; H04W 12/06; H04W 4/021; H04W 4/80; H04W 4/024; H04W 4/06; H04W 4/90; H04W 48/04; H04W 52/0251; H04W 76/10; H04W 76/14; H04W 4/48; H04W 76/15; H04W 92/02

USPC .................... 381/56–58, 74; 700/94
See application file for complete search history.

(56) References Cited

U.S. PATENT DOCUMENTS

| | | | |
|---|---|---|---|
| 2008/0170740 A1 | 7/2008 | Gantz | |
| 2010/0240417 A1* | 9/2010 | Wickman | H04W 52/027 |
| | | | 455/566 |
| 2010/0330908 A1* | 12/2010 | Maddern | H04M 1/6058 |
| | | | 704/270.1 |
| 2015/0289062 A1 | 10/2015 | Ungstrup et al. | |
| 2016/0127423 A1* | 5/2016 | Hassan | H04W 76/14 |
| | | | 715/716 |
| 2017/0070919 A1* | 3/2017 | Verger | H04L 67/14 |
| 2017/0090864 A1 | 3/2017 | Jorgovanovic | |
| 2018/0035207 A1* | 2/2018 | Hsu | H04R 3/12 |
| 2018/0227679 A1 | 8/2018 | Ungstrup et al. | |
| 2019/0237778 A1* | 8/2019 | Park | H01M 8/0234 |
| 2019/0327778 A1* | 10/2019 | Morris | H04W 88/04 |

OTHER PUBLICATIONS

Office Action for U.S. Appl. No. 16/249,100, mailed on Jul. 21, 2020, Jorgovanovic, "Two-Way Wireless Headphones," 16 pages.
Non Final Office Action dated Sep. 11, 2019 for U.S. Appl. No. 16/249,100 "Two-Way Wireless Headphones," Jorgovanovic, 20 pages.
Office Action for U.S. Appl. No. 16/249,100, mailed on Dec. 31, 2020, Jorgovanovic, "Two-Way Wireless Headphones," 14 pages.

* cited by examiner

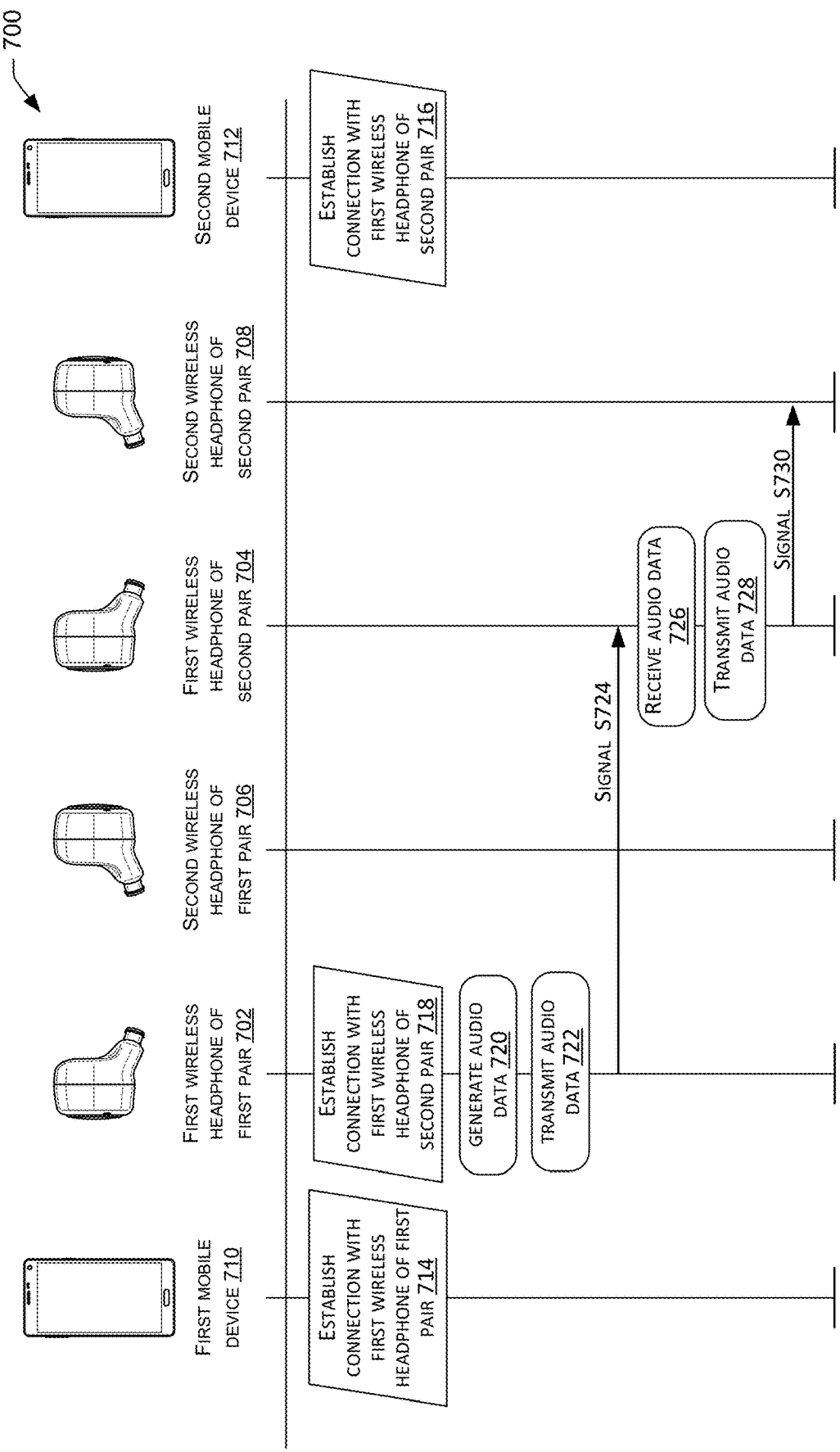

TWO-WAY WIRELESS HEADPHONES

RELATED APPLICATION

This application is a continuation of and claims priority to U.S. patent application Ser. No. 16/249,100, filed on Jan. 16, 2019, the disclosure of which is incorporated by reference herein.

BACKGROUND

Walkie-talkies are wireless radios that communicate on a shared frequency band and, in some instances, are designed for short-range communications in which users may communicate with one another. Walkie-talkies are traditionally hand-held devices, are often bulky, and are not conveniently worn by a user. Conventional walkie-talkies may also lack the ability to remotely couple to remote systems, perform speech processing, and/or respond to user commands. In some instances, users may desire hands-free walkie-talkies with a smaller profile and with increased computational capacities.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference number in different figures indicates similar or identical items. The systems depicted in the accompanying figures are not to scale and components within the figures may be depicted not to scale with each other.

FIG. 7A illustrates an example signal diagram for transmitting audio data between wireless headphones from multiple pairs of wireless headphones.

DETAILED DESCRIPTION

Figure 1:
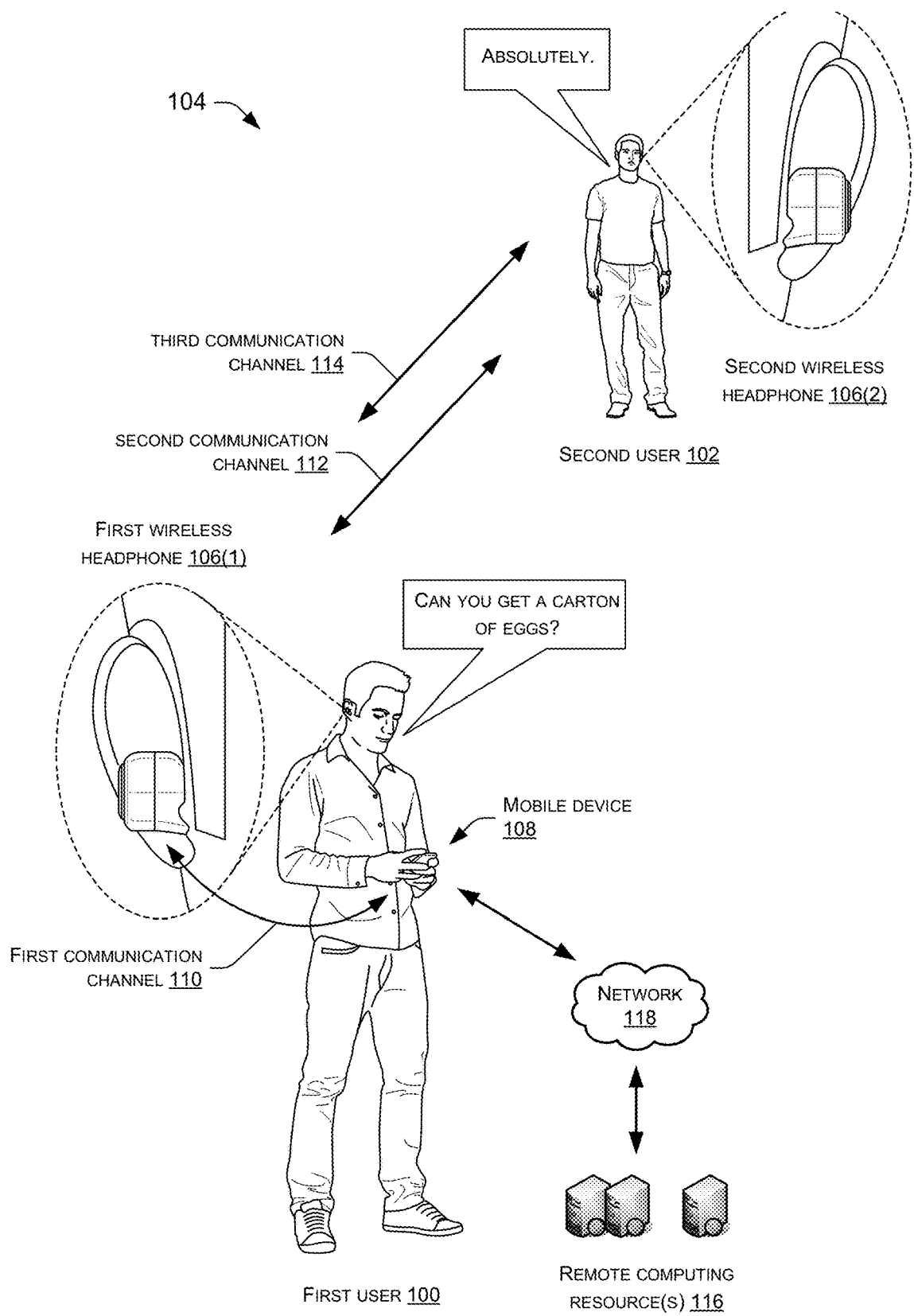
FIG. 1 illustrates an example environment showing a first user wearing a first wireless headphone and a second user wearing a second wireless headphone. The first wireless headphone and the second wireless headphone may communicatively couple via one or more communication channels. Using the one or more communication channels, the first wireless headphone and the second wireless headphone may transmit and/or receive audio settings and/or audio data. The first wireless headphone may also communicatively couple to a mobile device.

This disclosure describes, in part, techniques for configuring wireless speakers, wireless earbuds, and/or other forms of wireless headphones (e.g., in-ear, over-ear, on-ear, etc.) as walkie-talkies or devices capable of performing short-range, direct, two-way voice communication. The wireless headphones may include multiple (e.g., two, three, etc.) headphones that are synched, paired, or otherwise in communication with one another. In the examples described below, the techniques are described with reference to a pair of communicatively coupled wireless headphones. However, in some examples, the wireless headphones discussed herein may embody wireless headphones from multiple pairs of headphones.

The wireless headphones may include a first wireless headphone and a second wireless headphone. The first wireless headphone may directly or indirectly communicatively couple to an electronic device, such as a mobile device (e.g., phone, tablet, laptop, etc.) to receive audio data and/or settings (e.g., volume, mute, pause, etc.) while also transmitting (e.g., forwarding) the audio data to the second wireless headphone. In some instances, the wireless headphone currently communicatively coupled to the mobile device may be designated as a primary headphone (e.g., the first wireless headphone), while the wireless headphone that receives the audio data from the primary headphone may be designated as a secondary headphone (e.g., the second wireless headphone).

The first wireless headphone and the second wireless headphone may directly or indirectly communicatively couple via one or more communication channels, such as Bluetooth Low Energy (BLE), near-field magnetic induction (NFMI), ZigBee, Z-wave, Bluetooth hands-free profile (HFP) protocol, Wi-Fi, adaptive frequency technology (AFT), or the like. The first wireless headphone and the mobile device may communicatively couple via one or more communication channels, such as Bluetooth. The first wireless headphone may also communicatively couple to a remote system via the mobile device. For instance, the mobile device may transmit (e.g., forward) data received from the first wireless headphone to the remote system, vice versa.

In addition to serving as headphones for outputting music, phone calls, and/or other audio data, the wireless headphones may serve as walkie-talkies between one or more users. For instance, the wireless headphones may include one or more microphones and one or more loudspeakers, respectively, to capture and output sound. Using the one or more communication channels established between the wireless headphones, voice data may be transmitted and received between the first wireless headphone and the second wireless headphone. As an example, while shopping at a store, a first user wearing the first wireless headphone may engage in a conversation with a second user wearing the second wireless headphone.

Configuring the wireless headphones as walkie-talkies may involve a user issuing a request, such as a voice command. In some instances, the wireless headphones may include voice-processing components, such as a wake word component, that facilitates a detection of a trigger expression or wake word within the voice command. For instance, the first user may utter a voice command such as "enter walkie-talkie mode" or "configure wireless headphones as walkie-talkies." The wake word component of the first wireless headphone may identify the wake word (e.g., walkie-talkie) in the voice command, and in response, may transmit audio data associated with the voice command to the mobile device and/or the remote system for further speech processing. For example, in instances where the first wireless headphone detects the wake word, the first wireless headphone may transmit corresponding audio data associated with the verbal command to the mobile device, where the mobile device may transmit (e.g., forward) the audio data to the remote system. Comparatively, in instances where the second wireless headphone detects the wake word, the second wireless headphone may transmit the audio data or an indication of the wake word, to the first wireless headphone over a communication channel (e.g., BLE), where the first wireless headphone may transmit (e.g., forward) the audio data to the mobile device for forwarding to the remote system. In some instances, the first wireless headphone may retrieve the audio data from a buffer on the first wireless headphone and upon receiving the indication from the second wireless headphone that the audio data contains the wake word, or after the first wireless headphone performs speech processing on the audio data, the first wireless may transmit the audio data to the mobile device and/or the remote system.

The remote system, using one or more speech processing components, such as natural language processing (NLP), may identify the voice command and determine an intent of a user, such as a request to establish the wireless headphones as walkie-talkies. After determining the intent of the voice command, the remote system may perform or otherwise cause one or more actions to be performed. For instance, the remote system may transmit an instruction, via the mobile device, to the first wireless headphone that instructs or otherwise causes the wireless headphones to configure as walkie-talkies.

In some instances, configuring the wireless headphones as walkie-talkies may involve establishing a two-way voice communication channel between the first wireless headphone and the second wireless headphone over the two-way voice communication channel, the wireless headphones may exchange audio data corresponding to user speech. The two-way voice communication channel may include Bluetooth HFP protocol, which in some instances, may support extended synchronous connection oriented (eSCO) channels. In some instances, the Bluetooth HFP protocol may have a limited range. For instance, the Bluetooth HFP protocol may transmit the audio data up to 30 meters within indoor and outdoor environments.

Additionally, or alternatively, the wireless headphones may configure as walkie-talkies based on a user pressing a button on the first wireless headphone and/or the second wireless headphone. In these instances, the wireless headphones may include one or more sensors (e.g., an accelerometer, a capacitive touch surface, etc.) to detect the input. The wireless headphones may also include a push-to-talk button to capture audio data and transmit audio data between the wireless headphones.

The wireless headphones may detect additional trigger expressions or wake words within user utterances. For instance, the first user or the second user may ask a question or issue a command, such as "Alexa, what is the weather today?" or "please tell me what is playing at the local cinema." The wireless headphones may capture these utterances upon detection of a wake word (e.g., Alexa, please, etc.) and may transmit associated audio data to the remote system. As discussed above, the remote system may analyze and process the command, formulate a response, or otherwise cause an action to be performed. For instance, the remote system may process the audio data and may generate audio data associated with a response to be output at the wireless headphones, such as "the forecast shows mild-temperatures with a slight chance of rain." The remote system may transmit this response to the mobile device and the mobile device may transmit (e.g., forward) the response to the first wireless headphone. The first wireless headphone may therein transmit the response to the second wireless headphone via the two-way voice communication channel. In some instances, because the first wireless headphone receives the audio data from the mobile device first, the first wireless headphone may delay outputting the response until the second wireless headphone receives and outputs the audio data, thereby allowing the wireless headphones to synchronously output the audio.

The wireless headphones may terminate as the walkie-talkies through detecting a wake word within a voice command, such as "exit walkie-talkie mode." Here, the wireless headphones may detect the wake word (e.g., walkie-talkie), and upon detecting the wake word, may transmit audio data associated with the voice command to the mobile device and/or the remote system. The remote system may determine an intent of the user command (i.e., to exit the walkie-talkie mode) and may transmit a corresponding instruction to the wireless headphones. This instruction may cause the wireless headphones to exit the walkie-talkie mode and may terminate one or more communication channels between the wireless headphones, such as the Bluetooth HFP protocol and/or eSCO channels. In some instances, upon termination, the wireless headphones may establish another communication channel, such as NFMI, for streaming audio music between the wireless headphones.

As a result of the techniques discussed above, the wireless headphones may serve as walkie-talkies between one or more users. These techniques may permit a convenient form of communication as compared to traditional methods, such as making phones calls, texting, shouting across indoor/outdoor environments, and so forth. In some examples, the wireless headphones may be sophisticated voice-enabled devices that include components for processing voice commands, detecting the presence of one or more wake words within user speech, and may include network interfaces that configure the wireless headphones to communicate over one or more networks to send and receive data with various computing devices. In doing so, users may utilize the wireless headphones as a convenient form of communication with increased computational capacity.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

FIG. 1 illustrates a first user 100 and a second user 102 within an environment 104. The first user 100 is shown wearing a first wireless headphone 106(1), which may reside within the right ear of the first user 100, and the second user 102 is shown wearing a second wireless headphone 106(2), which may reside within the left ear of the second user 102. Collectively, the first wireless headphone 106(1) and the second wireless headphone 106(2) may be referred to herein as "the wireless headphones 106." The first wireless headphone 106(1) and the second wireless headphone 106(2) may be physically similar and look alike, while in other instances, one of the wireless headphones 106 may be designed for and designated as a right headphone while the another of the wireless headphones 106 may be designed for and designated as a left headphone. In some instances, the wireless headphones 106 may resemble earbud headphones that fit within the ear and/or ear canal, while in other instances, the wireless headphones 106 may reside atop the ear or over the ear.

The first wireless headphone 106(1) may communicatively couple to a mobile device 108 and/or the second wireless headphone 106(2) via one or more communication channel(s), such as Bluetooth (e.g., 802.11), NFMI, BLE, ZigBee (e.g., 802.15.4), Bluetooth HFP protocol, Z-wave, or the like. For instance, FIG. 1 illustrates that the first wireless headphone 106(1) may communicatively couple to the mobile device 108 over a first communication channel 110, which may include Bluetooth. The first wireless headphone 106(1) may also communicatively couple to the second wireless headphone 106(2) via one or more communication channels, such as a second communication channel 112 and/or a third communication channel 114. In some instances, the second communication channel 112 may include BLE over which the wireless headphones 106 may exchange control signals/data (e.g., pause, play, volume, etc.). The third communication channel 114 may include a Bluetooth HFP protocol, which may support eSCO links, over which the wireless headphones 106 may exchange additional audio data, such as voice data associated with user utterances. Compared to other communication protocols, a Bluetooth HFP protocol may reduce a latency in transmitted voice communication between the wireless headphones 106.

The mobile device 108 may communicatively couple to remote computing resource(s) 116 via a network 118 to transmit and receive audio data. Moreover, FIG. 1 illustrates that the second wireless headphone 106(2) is not communicatively coupled to the mobile device 108 but instead, the second wireless headphone 106(1) may communicate and/or receive audio data from the mobile device 108 and/or the remote computing resource(s) 116 via the first wireless headphone 106(1) and the second communication channel 112 and/or the third communication channel 114.

As the first wireless headphone 106(1) and the second wireless headphone 106(2) may be nearly indistinguishable, a user (e.g., the first user 100 and/or the second user 102) may conduct an out-of-box experience (OOBE) to associate the mobile device 108 with the wireless headphones 106. The OOBE may also configure one of the wireless headphones 106 as the first wireless headphone 106(1) and another of the wireless headphones 106 as the second wireless headphone 106(2). Additionally, the OOBE may configure the first wireless headphone 106(1) to establish a connection with the mobile device 108 (e.g., the first communication channel 110). In some instances, the first wireless headphone 106(1) may be considered a primary wireless headphone as it communicatively couples to the mobile device 108, while the second wireless headphone 106(2) may be considered a secondary wireless headphone as it receives data from the first wireless headphone 106(1).

The first user 100 and/or the second user 102 may utilize the wireless headphones 106 as walkie-talkies to communicate with one another and transmit voice messages. In some instances, the wireless headphones 106 may configure as walkie-talkies based on detecting a predefined verbal command, keyword, or wake word from at least one of the first user 100 or the second user 102. For instance, an audio capture component, such as a microphone, may capture audio corresponding to a voice command. The verbal commands may be captured by the microphones and the wireless headphone 106 that captured the audio may generate corresponding audio data. The wireless headphones 106, using a wake word component, may process generated audio data corresponding to the voice command to determine if the audio data contains a wake word. As an example, at least one of the first user 100 or the second user 102 may issue a verbal command such as "enter walkie-talkie mode" or "please configure walkie-talkie mode" to request that the wireless headphones 106 configure as walkie-talkies.

The wireless headphones 106 may include one or more voice-processing techniques to process the user speech (e.g., the audio data) and in some instances, the voice-processing techniques may occur upon detection of a wake word (e.g., "walkie-talkie"). In some instances, the wireless headphones 106 may have limited voice-processing techniques to process the user speech and/or determine an intent of the voice command. Instead, the wireless headphones 106 may perform pre-processing on the audio data containing the wake word and may transmit the audio data to the mobile device 108 and/or the remote computing resource(s) 116.

The mobile device 108 may include speech processing techniques to process the audio data, identify the request to configure the wireless headphones 106 as walkie-talkies, and may transmit an instruction (e.g., indication) to the wireless headphones 106 to establish the third-communication channel 114. Additionally, or alternatively, the mobile device 108 may transmit the audio data to the remote computing resource(s) 116 where the remote computing resource(s) 116 may perform more intensive processing using large amounts of resources available to the remote computing resource(s) 116. Discussed in detail herein, the remote computing resource(s) 116 may include one or more processors and memory that may store one or more speech-recognition component(s), such as an automatic speech-recognition (ASR) component or system and a natural-language-understanding (NLU) component or system. In some examples, the ASR component or system of the speech-recognition component(s) may receive audio data from the first wireless headphone 106(1) that represents the voice command and begin performing ASR on the audio data to generate text data that represents words of the voice command. The NLU component or system of the speech-recognition component(s) may use NLU to identify the voice commands and intents of those voice commands from the generated text data. Therein, the speech-recognition component(s) may determine an instruction or command to perform, or for the wireless headphones 106 to perform, based on the intent of the voice command. For instance, upon detecting the wake word, such as "walkie-talkie," the remote computing resource(s) 116 may identify the voice command as a request to configure the wireless headphones 106 as walkie-talkies.

In some instances, configuring the wireless headphones 106 as walkie-talkies may involve establishing the third communication channel 114 between the first wireless headphone 106(1) and the second wireless headphone 106(2). In some instances, the first wireless headphone 106(1) may establish the third communication channel 114 and/or may issue an instruction, via the second communication channel 112, for the second wireless headphone 106(2) to establish the third communication channel 114 with the first wireless headphone 106(1). Configuring the wireless headphones 106 as walkie-talkies may allow the wireless headphones to exchange voice data, audio data, and/or other data representing user speech via the third communication channel 114. For instance, the first user 100 and the second user 102 may utilize the wireless headphones 106 within various outdoor and indoor environments, such as a restaurant, shopping mall, a park, or a grocery store. As the users (i.e., the first user 100 and the second user 102) shop throughout the grocery store, the users may communicate with one another using the wireless headphones 106. For instance, FIG. 1 illustrates an utterance of the first user 100, such as "Can you get a carton of eggs?" The microphones of the first wireless headphone 106(1) may capture the utterance of the first user 100 and transmit, via the third communication channel 114, audio data representing the utterance. One or more speakers of the second wireless headphone 106(1) may output audio associated with the utterance of the first user 100. In some instances, the second user 102 may issue a response, such as "Absolutely." Microphones of the second wireless headphone 106(2) may capture this utterance, generate corresponding audio data, and the second wireless headphone 106(2) may transmit the audio data to the first wireless headphone 106(1), via the third communication channel 114, for output on one or more speakers of the first wireless headphone 106(1).

In some instances, the first wireless headphone 106(1) and/or the second wireless headphone 106(2) may include a push-to-talk (PTT) button that the first user 100 and/or the second user 102 may respectively press to capture and transmit audio data between the wireless headphones 106.

The first user 100 and/or the second user 102 may also utilize the wireless headphones 106 to perform additional commands using one or more predefined keywords or wake words. For instance, the first user 100 and/or the second user 102 may request that the wireless headphones 106 stream music, control a secondary device (e.g., turn on a TV, etc.), perform a phone call using the mobile device 108, respond to various commands, and so forth. That is, in addition to detecting a first keyword or wake word (e.g., walkie-talkie), the wireless headphones 106 may detect second keywords or wake words. In doing so, the wireless headphones may capture additional voice commands of the user, such as "Alexa, where is the nearest gas station?" or "How many feet are in a mile?" The wake word component of the first wireless headphone 106(1) and/or the second wireless headphone 106(2) may detect wake words from the audio data and perform speech processing. Upon detecting the wake word, the first wireless headphone 106(1) may transmit audio data associated with the verbal command to the remote computing resource(s) 116 for speech processing. The remote computing resource(s) 116 may determine an intent of the first user 110 and formulate a response (e.g., audio data) for output on the wireless headphones 106. In some instances, the audio data may be output on the wireless headphone 106 associated with the user issuing the verbal command, or may be output on both wireless headphones 106. In instances where the audio data is output on both wireless headphones 106, as the first wireless headphone 106(1) first receives the audio data, the first wireless headphone 106(1) may account for a latency in transmission between the first wireless headphone 106(1) and the second wireless headphone 106(2) and may delay output of the audio data such that the first user 100 and the second user 102 hear the response substantially simultaneously.

The wireless headphones 106 may terminate as walkie-talkies when either the first user 100 and/or the second user 102 issues a voice command, such as "exit walkie-talkie mode." As discussed above, the wireless headphones 106 may detect the wake word (e.g., walkie-talkie) and may transmit corresponding audio data to the mobile device 108 and/or the remote computing resource(s) 116 for speech processing.

Additionally, or alternatively, the first user 100 and/or the second user 102 may press a button on or at the wireless headphones 106. In some instances, the walkie-talkie mode may also exit when the signal strength of the third communication channel 114 is less than a threshold value. However, in some instances, rather than terminating the wireless headphones 106 as walkie-talkies when the signal strength is low and canceling the third communication channel 114, the wireless headphones 106 may switch to another communication protocol, such as BLE. Here, the wireless headphones 106 may continue transmitting audio data associated with user utterances. However, because Bluetooth HFP protocol may include a faster transfer rate than BLE, some latency may be introduced when transmitting the audio data via BLE. Additionally, in some instances, the wireless headphones 106 may output an audible warning over one or more speakers of the wireless headphones, respectively, if the signal strength of the third communication channel 114 is low or the third communication channel 114 is about to terminate.

Figure 2:
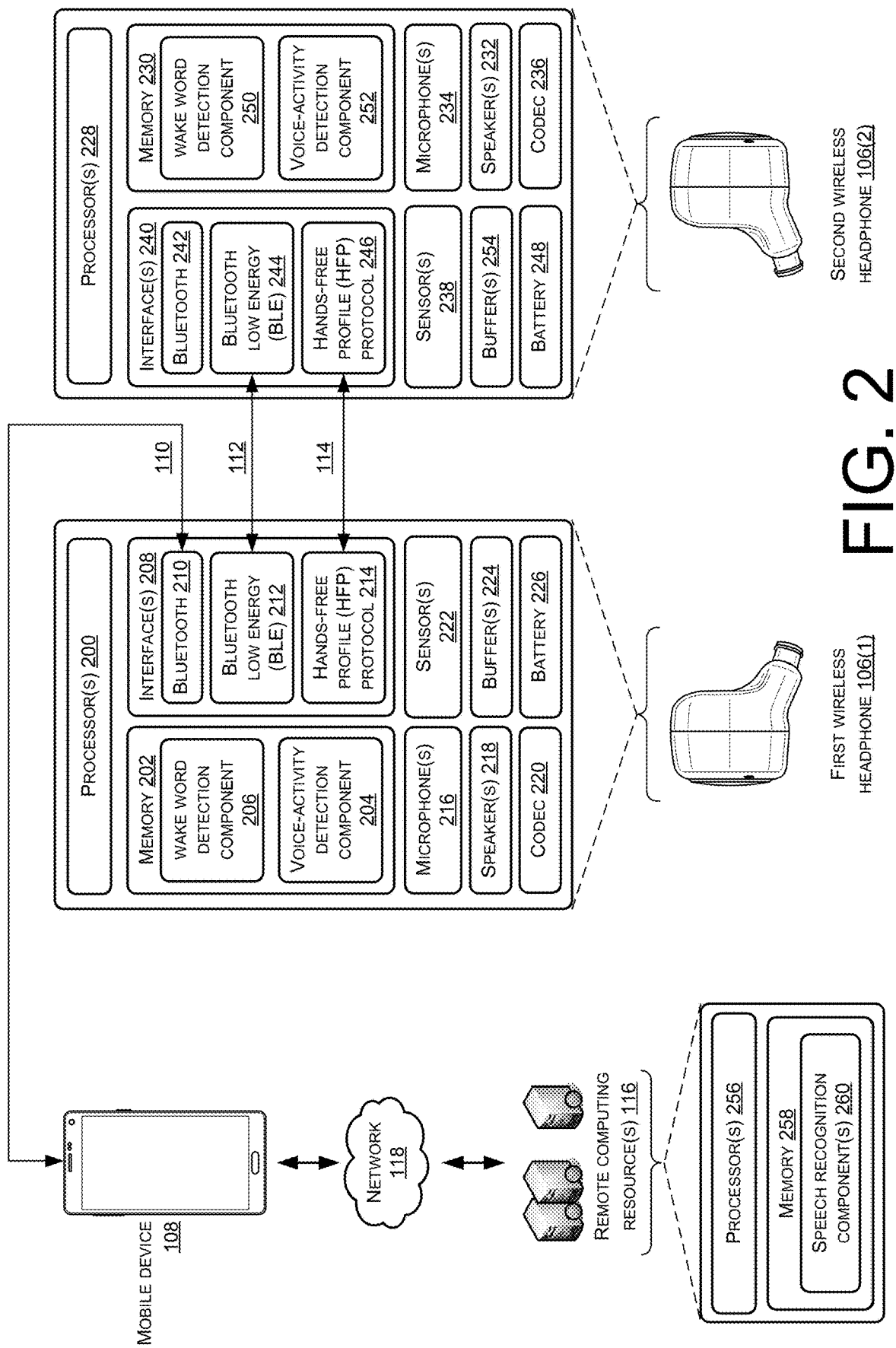
FIG. 2 illustrates a functional block diagram of example wireless headphones and an example remote computing resource(s), as well as communication channels between the wireless headphones, a mobile device, and/or the remote computing resource(s).

FIG. 2 illustrates selected functional components of the first wireless headphone 106(1), the second wireless headphone 106(2), and the remote computing resource(s) 116. Beginning with the first wireless headphone 106(1), the first wireless headphone 106(1) may include one or more processor(s) 200 and memory 202, which stores or otherwise has access to a voice activity detection (VAD) component 204 and/or a wake word detection component 206. As discussed above, the first wireless headphone 106(1) may use various techniques to detect user speech and determine voice commands issued by a user, such as a first user 100. The VAD component 204 and/or the wake word component 206 may work in conjunction with other components of the first wireless headphone 106(1). For example, the one or more processor(s) 200 of the first wireless headphone 106(1) may convert captured audio into audio data, and process the audio data with the VAD component 204 and/or the wake word component 206.

The VAD component 204 may utilize one or more VAD algorithms based on channel energy with long- and short-term energies, sub-band long- and short-term energies with combination logic, Deep Neural Network (DNN) based VADs, or any other type of VAD algorithms, with hangover windows, to determine whether the audio signal represents user speech.

The wake word component 206 may be utilized to detect predetermined utterances, voice commands, and/or wake words within user speech. Such process may be referred to as keyword detection, with the wake word being a specific example of a keyword. For instance, in capturing and generating audio data, the audio data is analyzed to determine if specific characteristics of the user speech match preconfigured acoustic waveforms, audio signatures, keyword-spotting technology, ASR techniques, or other expression detectors "matches" stored audio data corresponding to a keyword. Additionally, or alternatively, the wake word component 206 may include application program interfaces (APIs), speech-processing application(s), a digital signal processor, and/or other components to detect commands and wake words uttered by a user. The wake word component 206 may therefore detect a predefined trigger expression or words (e.g., "awake," "walkie-talkie," "Alexa," etc.), which may be followed by instructions or directives (e.g., "please play song A," "please give me directions to the grocery store," "enable walkie-talkie mode," etc.).

In some instances, the first wireless headphone 106(1) may format or otherwise prepare the audio data for speech processing upon detecting the wake word. Formatting the audio data may include, for example, audio beamforming, signal optimization, and/or associating metadata with the audio data. In some instances, the audio data including the user speech and/or the wake word may be tagged or indications may otherwise be provided along with the audio data indicating which portion of the audio data corresponds to the wake word and/or which portion of the audio data represents the remainder of the user utterance.

In some instances, the first wireless headphone 106(1) may transmit the audio data to the remote computing resource(s) 116 for speech processing. Accordingly, once the wake word is detected, the first wireless headphone 106(1) may begin transmitting, via the mobile device 108, audio data corresponding to audio captured at the first wireless headphone 106(1). Audio data corresponding to that audio may be sent to remote computing resource(s) 116 for interpreting the user speech (either for purposes of enabling voice-communications and/or for purposes of executing a command in the speech). As will be discussed herein, the remote computing resource(s) 116 may analyze the user speech, perform certain actions, generate one or more responses, cause certain actions to be performed, and/or transmit a response to the first wireless headphone 106(1).

The first wireless headphone 106(1) may include interface(s) 208 to communicate over the network 118 to directly or indirectly send and receive data with various computing devices, such as the mobile device 108 and/or the remote computing resource(s) 116. The interface(s) 208 may enable the first wireless headphone 106(1) to communicate over any type of network, such as wireless networks (e.g., Wi-Fi, Bluetooth, Personal Area Networks, Wide Area Networks, and so forth). As shown in FIG. 2, the interface(s) 208 of the first wireless headphone 106(1) may include a Bluetooth interface 210, a BLE interface 212, and/or a Bluetooth HFP protocol interface 214. However, in some instances, the first wireless headphone 106(1) may include additional interface(s) 208, such as an NFMI interface that allows the first wireless headphone 106(1) to transmit audio data with the second wireless headphone 106(2).

The first wireless headphone 106(1) may directly communicate and/or receive data from the mobile device 108 via a first communication channel 110, which may include Bluetooth. The first wireless headphone 106(1) may directly communicate and/or receive data from the second wireless headphone 106(2) using one or more separate communication channels. For instance, the first wireless headphone 106(1) may transmit audio data settings and/or commands (e.g., volume up, answer phone call, etc.) over a second communication channel 112, such as BLE, and may transmit audio data over a third communication channel 114, such as Bluetooth HFP protocol.

In some instances, the first wireless headphone 106(1) may communicatively couple to the remote computing resource(s) 116 over the network 118 via the mobile device 108. The mobile device 108 may serve as an interface between the remote computing resource(s) 116 and the first wireless headphone 106(1). In some instances, the mobile device 108 may communicatively couple to the network 118 using wireless technologies (e.g., RF, cellular, satellite, Bluetooth, etc.), or other connection technologies such that the mobile device 108 communicatively couples the first wireless headphone 106(1) to the remote computing resource(s) 116. However, the first wireless headphone 106 (1) may communicatively couple to the remote computing resource(s) 116 without utilizing the mobile device 108, for instance, using a cellular, RF, or satellite interfaces.

The first wireless headphone 106(1) may include one or more microphone(s) 216 to capture user speech and generate audio data associated with user utterances and/or commands. In some instances, the microphone(s) 216 may include a first microphone directed towards an ear canal of a user (e.g., the first user 100) and a second microphone directed outward in an opposite direction. The first microphone may capture sound originating from the ear canal (e.g., humming, coughing, clearing through, etc.) while the second microphone may capture sound originating from an environment (e.g., the environment 104) outside the ear canal. The first wireless headphone 106(1) may use the first microphone to generate a first audio signal representing sound emitted largely through the ear canal when the user speaks, and use the second microphone to generate a second audio signal representing sound from the environment 104. In some examples, the first wireless headphone 106(1) may utilize acoustic isolation between the first microphone and the second microphone to prevent the first wireless microphone capturing primarily the same sound. Through acoustic isolation, the first microphone may represent sounds that were emitted by the first user 100. Moreover, audio data captured by the second microphone may cancel ambient noise from the environment 104 through generating a noise-cancelling wave that is 180° out of phase with the ambient noise.

The first wireless headphone 106(1) may also include one or more speakers(s) 218 to output audio data received from the second wireless headphone 106(2), the mobile device 108, and/or the remote computing resource(s) 116.

A codec 220 may communicatively couple to the microphone(s) 216 and/or the speaker(s) 218 to encode and decode audio signals, respectively. The codec 220 may also convert audio data between analog and digital formats. In some instances, the codec 220 may encode user speech and transfer the audio data to other components of the first wireless headphone 106(1), such as the wake word detection component 206.

The first wireless headphone 106(1) may include sensor(s) 222, such as accelerometers, capacitive touch sensors, buttons, motion sensors, and so forth, capable of receiving and/or detecting touch input. For example, to increase the volume of the audio output by the speaker(s) 218, the first user 100 may tap or perform a series of touch inputs at the first wireless headphone 106(1). The sensor(s) 222 may detect this touch, whether by an accelerometer or capacitive touch sensor, and the processor(s) 200 may determine a command associated with the touch (e.g., increasing the volume, answering a phone call, etc.).

The first wireless headphone 106(1) may further include buffer(s) 224 for storing, at least temporarily, various types of data, such as audio data. By storing audio data in the buffer(s) 224, the first wireless headphone 106(1) may perform various types of noise-cancellation techniques. The buffer(s) 224 may also store audio data received from the second wireless headphone 106(2), and if the first wireless headphone 106(1) receives an indication that the audio data received from the second wireless headphone 106(2) includes a wake word, the first wireless headphone 106(1)

may retrieve the stored audio data and transfer the audio data to remote computing resource(s) 116 via the mobile device 108. In some instances, the first wireless headphone 106(1) may temporarily store all or a portion of the audio data received from the second wireless headphone 106(2) in the buffer(s) 224.

A battery 226 is further provided to distribute power to the various components of the first wireless headphone 106(1).

The second wireless headphone 106(2) may include similar components as the first wireless headphone 106(1), such as one or more processor(s) 228, memory 230, one or more speaker(s) 232, one or more microphone(s) 234, a codec 236, sensor(s) 238, and one or more interface(s) 240, including a Bluetooth interface 242, a BLE interface 244 to receive audio data settings, and/or a Bluetooth HFP protocol interface 246 to receive audio data from the first wireless headphone 106(1). The second wireless headphone 106(2) may also include a battery 248. Additionally, to detect wake words within user speech, such as the second user 102, or perform VAD techniques, the memory 230 of the second wireless headphone 106(2) may store or otherwise have access to a wake word detection component 250 and/or a voice activity detection component 252.

While the first wireless headphone 106(1) is discussed herein as communicatively coupling to the mobile device 108, in some instances, the second wireless headphone 106(2) may communicatively couple to the mobile device 108. Additionally, in some instances, the second wireless headphone 106(2) may perform similar or identical functions as the first wireless headphone 106(1), such as buffering audio data with one or more buffer(s) 254. In other words, depending on the OOBE, the second wireless headphone 106(2) may be configured as the primary headphone and may communicatively couple to the remote computing resource(s) 116, whether indirectly (e.g., via the mobile device 108 and/or the first wireless headphone 106(1)) or directly (e.g., via the network 118).

As discussed above, in some instances, the wireless headphones 106 may operate in conjunction with the remote computing resource(s) 116. The remote computing resource(s) 116 may be implemented as one or more servers and may, in some instances form a portion of a network-accessible computing platform implemented as a computing infrastructure of processors, storage, software, data access, and so forth that is maintained and accessible via a network such as the Internet. Cloud-based systems may not require end-user knowledge of the physical location and configuration of the system that delivers the services. Common expressions associated for these remote computing resource(s) 116 include "on-demand computing", "software as a service (SaaS)", "platform computing", "network-accessible platform", "cloud services", "data centers", and so forth.

The remote computing resource(s) 116 may include processor(s) 256 and memory 258 that have access to and utilize speech recognition component(s) 260 for receiving audio signals from the first wireless headphone 106(1), recognizing speech and, potentially, causing actions to be performed in response. In some examples, the first wireless headphone 106(1) may upload audio data to the remote computing resource(s) 116 for processing given that the remote computing resource(s) 116 may have a computational capacity that far exceeds the computational capacity of the first wireless headphone 106(1) and/or the second wireless headphone 106(2). Therefore, the wireless headphones 106 may utilize the speech recognition component(s) 260 for performing relatively complex analysis on audio captured at the wireless headphones 106.

To perform speech processing, the speech recognition component 260 may include automatic speech recognition (ASR) components, natural language understanding (NLU) components, text-to-speech components, and/or speechlets. The ASR component may process the audio data to generate text data corresponding to the audio data. The NLU component may utilize the text data to determine an intent associated with the user utterance, where the intent is utilized to select and/or utilize the one or more speechlets, which may be utilized to generate a response or command to perform in response to the user utterance.

Generally, the NLU process takes textual input (such as processed from ASR based on the utterance input audio) and attempts to make a semantic interpretation of the text. The NLU process determines the meaning behind the text based on the individual words and then implements that meaning. NLU processing interprets a text string to derive an intent or a desired action from the user as well as the pertinent pieces of information in the text that allow a device (e.g., the wireless headphones 106) to complete that action. For example, if a spoken utterance is processed using ASR and outputs the text "play Song A" the NLU process may determine that the user intended to have audio corresponding to Song A played. The NLU process may parse and tag to annotate text as part of NLU processing. For example, for the text "play Song A," "play" may be tagged as a command (to output audio) and "Song A" may be tagged as the identifier of the audio to be output. The output data from the NLU processing (which may include tagged text, commands, etc.) may then be sent to the processor(s) 256 for outputting the audio data associated with Song A.

By way of example, to configure the wireless headphone 106 as walkie-talkies, the first user 100 may utter a verbal command, such as "please configure wireless headphones as walkie-talkies." The wake word component 206 of the first wireless headphone 106(1) may detect the wake word and transmit audio data associated with the verbal command to the remote computing resource(s) 116 for speech processing to determine an intent of the first user 100. In response, the remote computing resource(s) 116 may determine an action to be performed and may transmit an instruction to the wireless headphones 106 to establish the third communication channel 114.

However, the remote computing resource(s) 116 may respond to and perform other actions in response to additional verbal commands. For instance, the first user 100 (or the second user 102) may utter a verbal command, such as "I'd like to go to a movie. Please tell me what's playing at the local cinema." The remote computing resource(s) 116 may analyze the user speech, perform certain actions (e.g., determine what's playing at local cinemas), generate a response, and transmit the response to the wireless headphones 106 for output. Accordingly, the verbal commands may be for essentially type of operation, such as database inquires, requesting and consuming entertainment (e.g., gaming, finding and playing music, movies or other content, etc.), personal management (e.g., calendaring, note taking, etc.), online shopping, financial transactions, and so forth.

As used herein, a processor, such as processor(s) 200, 228 and/or 256 may include multiple processors and/or a processor having multiple cores. Further, the processor(s) may comprise one or more cores of different types. For example, the processor(s) may include application processor units, graphic processing units, and so forth. In one implementation, the processor(s) may comprise a microcontroller and/or a microprocessor. The processor(s) may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) may possess its own local memory, which also may store program components, program data, and/or one or more operating systems.

The memory 202, 230, and/or 258 may include volatile and nonvolatile memory, removable and non-removable media implemented in any method or technology for storage of information, such as computer-readable instructions, data structures, program component, or other data. Such memory may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory may be implemented as computer-readable storage media ("CRSM"), which may be any available physical media accessible by the processor(s) to execute instructions stored on the memory. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

FIGS. 3-9 illustrate various processes related to configuring wireless headphones as walkie-talkies. The processes described herein are illustrated as collections of blocks in logical flow diagrams, which represent a sequence of operations, some or all of which may be implemented in hardware, software, or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1 and 2, although the processes may be implemented in a wide variety of other environments, architectures and systems.

Figure 3:
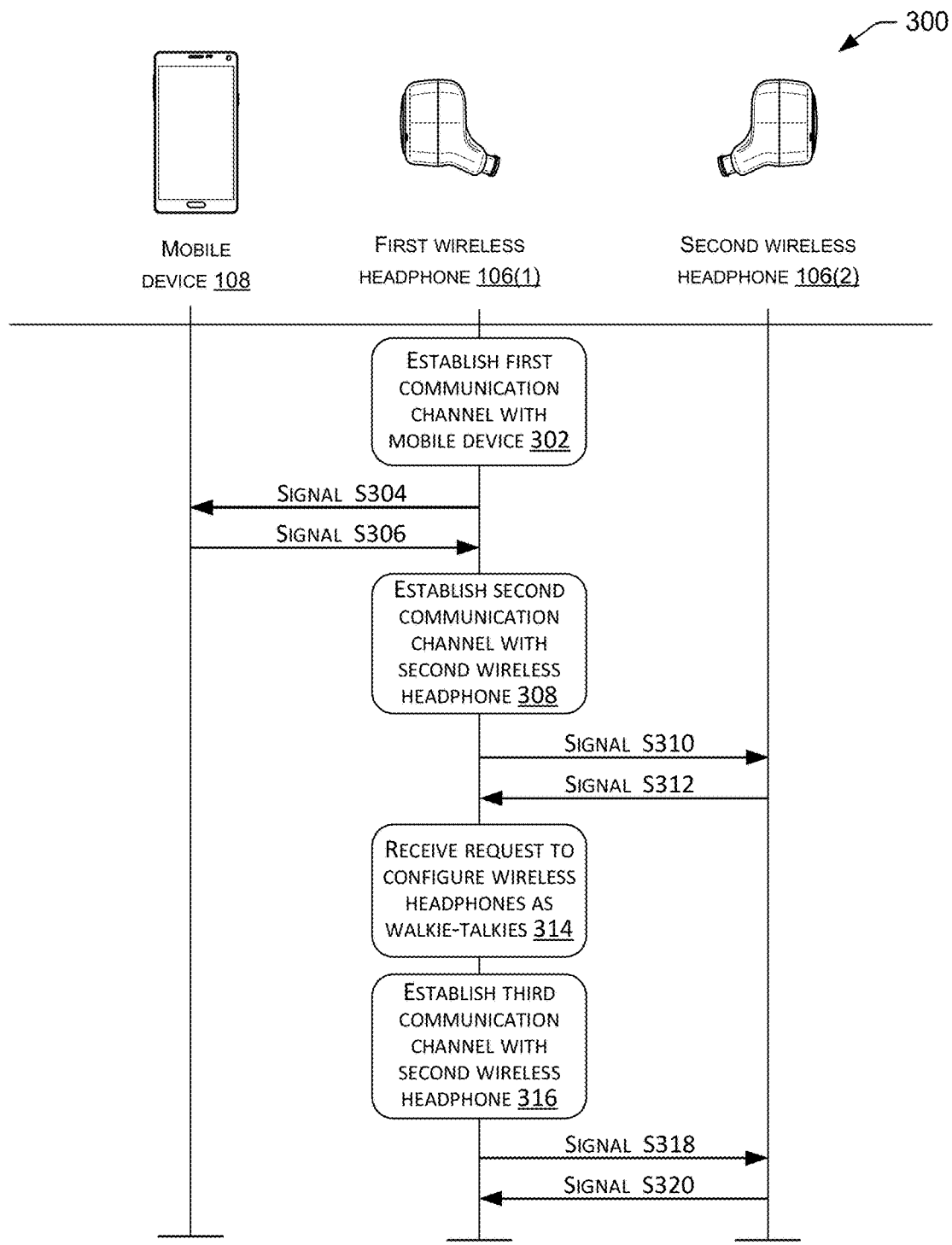
FIG. 3 illustrates an example signal diagram for configuring the wireless headphones as walkie-talkies.

FIG. 3 illustrates a signal diagram of an example process 300 for configuring wireless headphones, such as wireless headphones 106, as walkie-talkies.

At 302, a first wireless headphone 106(1), may establish a first communication channel 110 with a mobile device 108. For instance, upon powering on, the first wireless headphone 106(1) may establish the first communication channel 110 with the mobile device 108. Alternatively, the first wireless headphone 106(1) may receive, from the mobile device 108, a request (e.g., indication) to pair with the mobile device 108. In some instances, the first communication channel 110 between the first wireless headphone 106(1) and the mobile device 108 may include Bluetooth. Additionally, in some instances, establishing the first communication channel 110 may include the first wireless headphone 106(1) and the mobile device 108 exchanging signals, data, device identifiers, as shown by signals S304 and S306.

At 308, the first wireless headphone 106(1) may establish a second communication channel 112 with a second wireless headphone 106(2). In some instances, the second communication channel 112 may include BLE. The second communication channel 112 may allow for control signaling between the first wireless headphone 106(1) and the second wireless headphone 106(2), such as a volume setting of audio output at the wireless headphones 106. Additionally, in some instances, establishing the second communication channel 112 may include the first wireless headphone 106(1) and the second wireless headphone 106(2) exchanging signals, data, device identifiers, as shown by signals S310 and S312.

At 314, the process 300 may receive a request to configure the wireless headphones 106 as walkie-talkies, or otherwise initiate a two-way voice communication between the first wireless headphone 106(1) and the second wireless headphone 106(2). For instance, a first user 100 user wearing the first wireless headphone 106(1) may utter a verbal command such as "enter walkie-talkie mode." The first wireless headphone 106(1) may include speech-processing components, such as a wake word component, that detects a predetermined wake word (e.g., walkie-talkie) and may capture audio associated with the verbal command. In some instances, the first wireless headphone 106(1), upon detecting the wake word, may transmit audio data associated with the verbal command to the mobile device 108. The mobile device 108 may transmit the audio data to remote computing resource(s) 116 to analyze the audio data and determine an intent associated with the verbal command. However, in some instances, the mobile device 108 may analyze the audio data to determine the intent of the verbal command. In either scenario, the remote computing resources 116 and/or the mobile device 108 may transmit an instruction to the first wireless headphone 106(1) to establish a third communication channel 114, which may include a Bluetooth HFP protocol and eSCO communication links.

Additionally, or alternatively, the first user 100 may issue a sequence of touch inputs at the first wireless headphone 106(1) (e.g., double-tap) or may enter a request on a user interface of the mobile device 108.

Moreover, the second wireless headphone 106(2) may include components to detect or otherwise receive the request to configure the wireless headphones 106 as walkie-talkies. For instance, the second wireless headphone 106(2) may include a wake-word component, and upon detecting a wake word within an utterance or voice command of a second user 102, may transmit corresponding audio data associated with the verbal command to the first wireless headphone 106(1). In some instances, the second wireless headphone 106(2) may transmit an indication, or audio data associated with the verbal command via the second communication channel 112. In turn, the first wireless headphone 106(1) may transmit the audio data to the mobile device 108 and/or the remote computing resource(s) 116.

At 316, the first wireless headphone 106(1) may establish a third communication channel 114 with the second wireless headphone 106(2). Accordingly, the third communication channel 114 may allow the first user 100 to communicate with the second user 102. In some instances, establishing the third communication channel 114 may include the first wireless headphone 106(1) transmitting a request, or signal S318, instructing the second wireless headphone 106(2) to establish the third communication channel 114. In some instances, the first wireless headphone 106(1) may transmit the request (i.e., the signal S318) via the second communication channel 112. The second wireless headphone 106(2) may transmit an acknowledgement, such as signal S320, to the first wireless headphone 106(1) upon establishing the third communication channel 114.

In some instances, such as when the first user 100 shares one of the wireless headphones 106 with the second user 102, the second wireless headphone 106(2) may communicatively couple to the mobile device 108. For instance, if the first user 100 lends the first wireless headphone 106(1) to the second user 102 and keeps the second wireless headphone 106(2), the second wireless headphone 106(2) may communicatively couple to the mobile device 108. In these scenarios, the first wireless headphone 106(1) and the second wireless headphone 106(2) may swap roles. As such, the second wireless headphone 106(2) may communicate with the mobile device 108 via the first communication channel 110 and the connection between the first wireless headphone 106(1) and the mobile device 108 may terminate. In some instances, the mobile device 108 may monitor conditions associated with a connection between the first wireless headphone 106(1) (or the second wireless headphone 106(2)) and the mobile device 108, such as a physical proximity of the mobile device 108 and the first wireless headphone 106(1), a signal strength between the mobile device 108 and the first wireless headphone 106(1), an error rate associated with transmitting audio packets (e.g., advanced audio distribution profile packets (A2DP) packets), an environmental RSSI associated with an environment in which the wireless headphones 106 reside, and/or the like. If the mobile device 108 determines the signal strength between the first wireless headphone 106(1) and the mobile device 108 is below a certain threshold, the mobile device 108 may attempt to communicatively connect with the second wireless headphone 106(2). As noted above, this scenario may arise, for instance, if the first user 100 having the wireless headphones 106 and mobile device 108 lends the first wireless headphone 106(1) (e.g., primary headphone) to the second user 102 and the second user 102 walks away from the first user 100 and the mobile device 108. Here, the first user 100 may maintain the second wireless headphone 106(2) and because the first wireless headphone 106(1) may no longer be within range of the mobile device 108, the second wireless headphone 106(2) may be designated as the primary headphone and communicatively couple to the mobile device 108.

Figure 4:
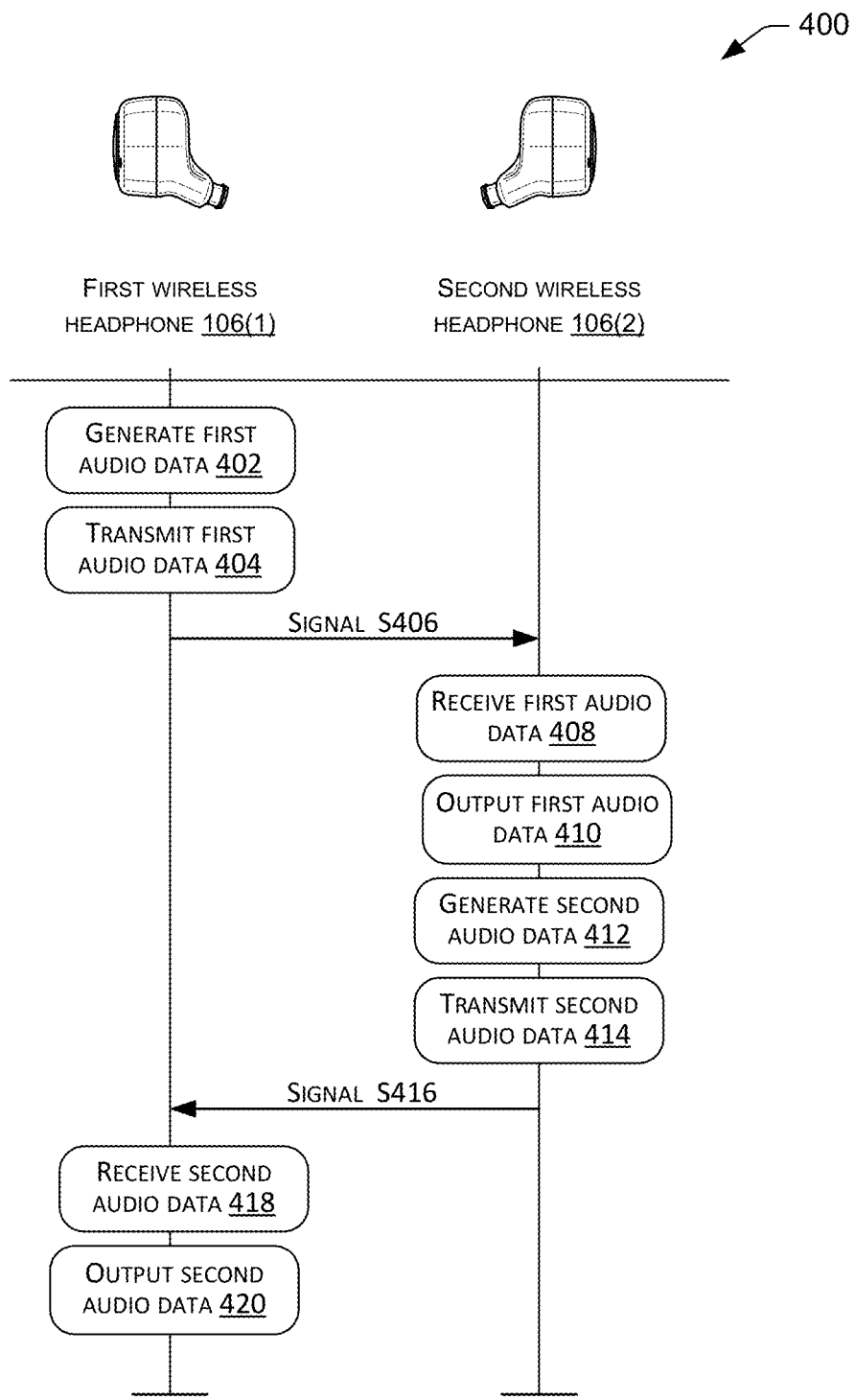
FIG. 4 illustrates an example signal diagram for transmitting audio data between the wireless headphones.

FIG. 4 illustrates a process 400 for transmitting and receiving audio data corresponding to user utterances between wireless headphones 106. In some instances, the process 400 may continue from the process 300 once a third communication channel 114 is established between the wireless headphones 106 and the wireless headphones 106 are configured as walkie-talkies.

At 402, a first wireless headphone 106(1) may capture audio via one or more microphones 216 and generate corresponding first audio data. As an example, a first user 100 wearing the first wireless headphone 106(1) may initiate a conversation with a second user 102 wearing a second wireless headphone 106(2).

At 404, the first wireless headphone 106(1) may transmit the first audio data to the second wireless headphone 106(2) via the third communication channel 114. In some instances, the first wireless headphone 106(1) may transmit a signal S406 to the second wireless headphone 106(2) that includes the first audio data.

At 408, the second wireless headphone 106(2) may receive the first audio data from the first wireless headphone 106(1) via the third communication channel 114.

At 410, the second wireless headphone 106(2) may output the first audio data. For instance, the second wireless headphone 106(2) may output audio associated with the first audio data via one or more speakers 232 of the second wireless headphone 106(2).

At 412, a second wireless headphone 106(2), may capture audio via one or more microphones 234 and generate corresponding second audio data. As an example, the second user 102 wearing the second wireless headphone 106(2) may respond to a question of the first user 100 and/or may engage in other conversations with the first user 100.

At 414, the second wireless headphone 106(2) may transmit the second audio data to the first wireless headphone 106(1) via the third communication channel 114. In some instances, the second wireless headphone 106(2) may transmit a signal S416 to the second wireless headphone 106(2) that includes the second audio data.

At 418, the first wireless headphone 106(1) may receive the second audio data from the second wireless headphone 106(2) via the third communication channel 114.

At 420, the first wireless headphone 106(1) may output the second audio data. For instance, the first wireless headphone 106(1) may output audio associated with the second audio data via one or more speakers 218 of the first wireless headphone 106(1).

Figure 5A:
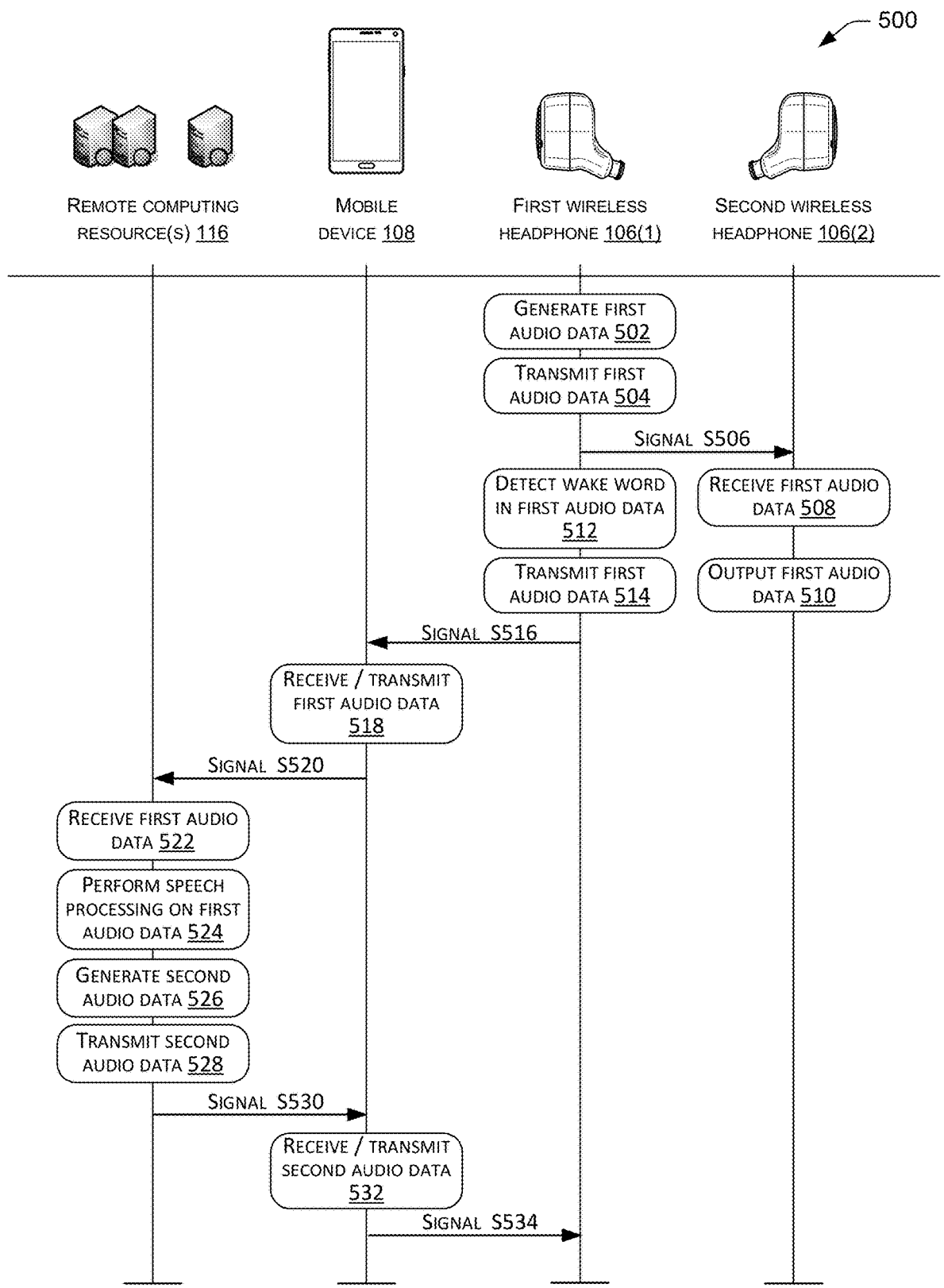
FIG. 5A illustrates an example signal diagram for detecting a wake word within captured audio data and performing speech processing on the audio data.
Figure 5B:
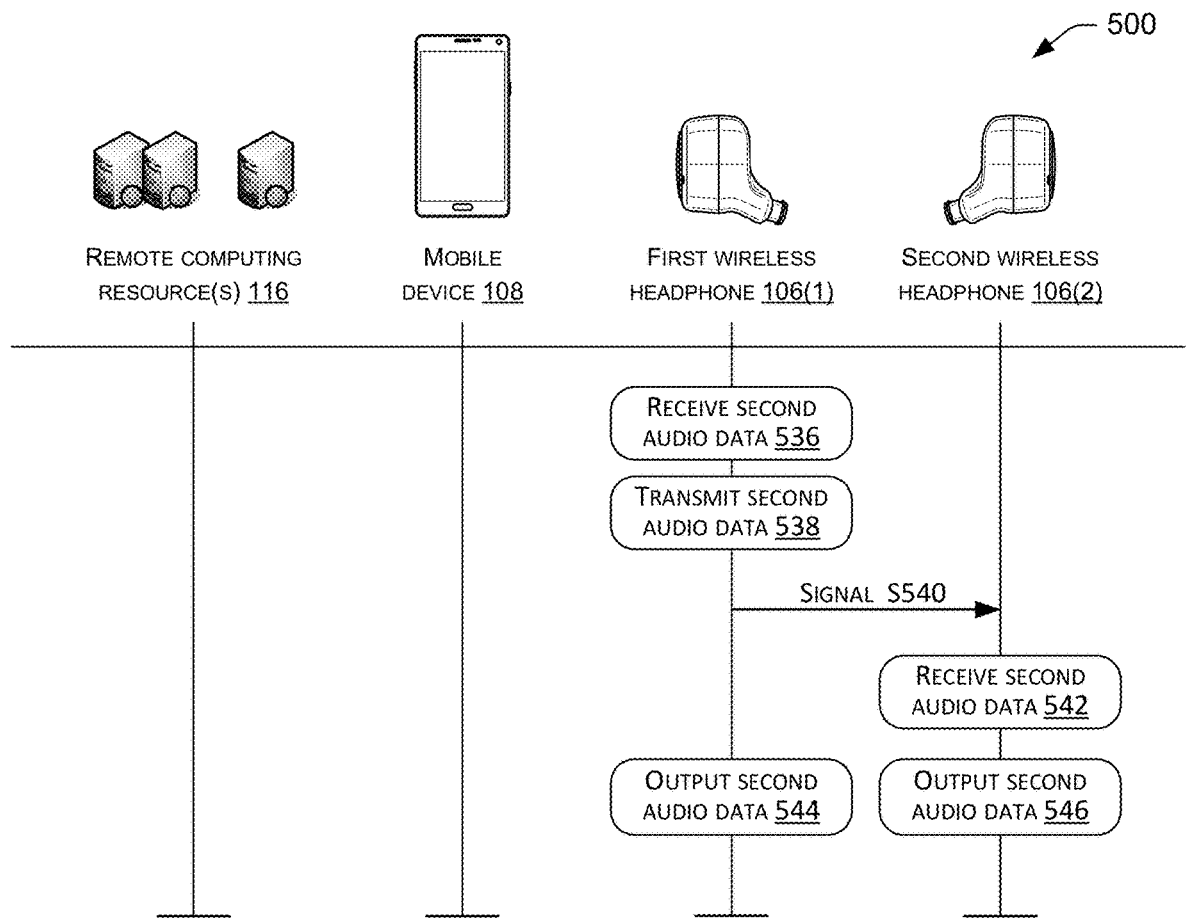
FIG. 5B illustrates an example signal diagram for detecting a wake word within captured audio data and performing speech processing on the audio data.

FIGS. 5A and 5B illustrate an example process 500 of detecting one or more voice commands at a first wireless headphone 106(1). In some instances, the process 500 may continue from the process 300 once a third communication channel 114 is established between wireless headphones 106 and the wireless headphones 106 are configured as walkie-talkies.

Beginning with FIG. 5A, at 502, the first wireless headphone 106(1) may capture audio via one or more microphone(s) 216 and generate corresponding first audio data. For instance, a first user 100 wearing the first wireless headphone 106(1) may utter a verbal command such as, "Alexa, what is the weather?" At 504, the first wireless headphone 106(1) may transmit the first audio data to a second wireless headphone 106(2) via the third communication channel 114. In some instances, the first wireless headphone 106(1) may transmit a signal S506 to the second wireless headphone 106(2) that includes the first audio data. At 508, the second wireless headphone 106(2) may receive the first audio data and at 510 may output audio associated with the first audio data via one or more speaker(s) 232.

At 512, the first wireless headphone 106(1) may detect a wake word within the first audio data. For instance, the first wireless headphone 106(1) may perform speech processing on the first audio data using a wake word detection component 206 to determine that the first audio data includes a wake word. For instance, the first user 100 wearing the first wireless headphone 106(1) issue a verbal command including a trigger expression or word (e.g., "awake," "Alexa," etc.), which may be followed by instructions or directives (e.g., "what is the weather," "how may ounces are in a cup," etc.).

At 514, the first wireless headphone 106(1) may transmit the first audio data to a mobile device 108 via a first communication channel 110 based at least in part on detecting the wake word within the first audio data. In some instances, the first wireless headphone 106(1) may transmit a signal S516 to the mobile device 108 that includes the first audio data. Additionally, the first audio data transmitted at 514 may include data corresponding to the wake word, or the portion of the first audio data corresponding to the wake word may be removed by the first wireless headphone 106(1).

At 518, the mobile device 108 may receive the first audio data and may transmit, via a network 118, the first audio data to remote computing resource(s) 116. In some instances, the mobile device 108 may transmit a signal S520 to the remote computing resource(s) 116 that includes the first audio data.

At 522, the remote computing resource(s) 116 may receive the first audio data from the mobile device 108.

At 524, the remote computing resource(s) 116 may perform speech processing on the first audio data. For example, speech recognition component(s) 260 of the remote computing resource(s) 116 may process the first audio data to generate corresponding text data and may utilize (e.g., via a NLU component) the text data to determine an intent associated with a verbal command of the first user 100, which may include requesting output requested audio, displaying requested content, and/or one or more other actions.

At 526, the remote computing resource(s) 116 may generate second audio data. The second audio data may relate to a response to the verbal command of the first user 100. For instance, if the first user 100 issues a verbal command such as "what is the weather," the generated second audio data may include a response to the verbal command, such as "currently, it is 70 degrees."

At 528, the remote computing resource(s) 116 may transmit the second audio data to the mobile device 108, which may include transmitting a signal S530 that includes second audio data. However, in some instances, the remote computing resource(s) 116 may not transmit the second audio data or other data back to the first wireless headphone 106(1). For instance, the first user 100 may issue a verbal command such as "schedule a doctor appointment for Tuesday" or "please remind me tomorrow about my doctor appointment." Here, the remote computing resource(s) 116 may perform an action such as updating a calendar of the first user 100, but in some instances, may not transmit second audio data to the first wireless headphone 106(1). Moreover, in some instances, the verbal command may relate to outputting certain content (e.g., music) or placing a phone call. In such instances, the remote computing resource(s) 116 may cause certain actions to be performed without generating second audio data. For instance, the remote computing resource(s) 116 may transmit audio data associated with a song or may place a phone call on behalf of the first user 100.

At 532, the mobile device 108 may receive the second audio data and may transmit the second audio data to first wireless headphone 106(1). In some instances, the mobile device 108 may transmit a signal S534 that includes the second audio data.

Moving to FIG. 5B, at 536, the first wireless headphone 106(1) may receive the second audio data and at 538 may transmit, via the third communication channel 114, the second audio data to second wireless headphone 106(2), which may include transmitting a signal S540 that includes the second audio data.

At 542, the second wireless headphone 106(2) may receive the second audio data.

At 544 and 546, the first wireless headphone 106(1) and the second wireless headphone 106(2) may respectively output audio associated with the second audio data. In some instances, the second audio data may be substantially simultaneously output at the first wireless headphone 106(1) and the second wireless headphone 106(2) such that the first user 100 and the second user 102 hear audio associated with the second audio data at substantially the same time.

As a result of the process 500, the first user 100 may issue a verbal command, the first wireless headphone 106(1) may determine that the voice command is intended to be received and acted upon (i.e., by detecting the wake word) and may transmit audio data associated with the verbal command to the remote computing resource(s) 116 for speech processing. According, the verbal command of the first user 100 may be interpreted and an action may be performed.

Figure 6:
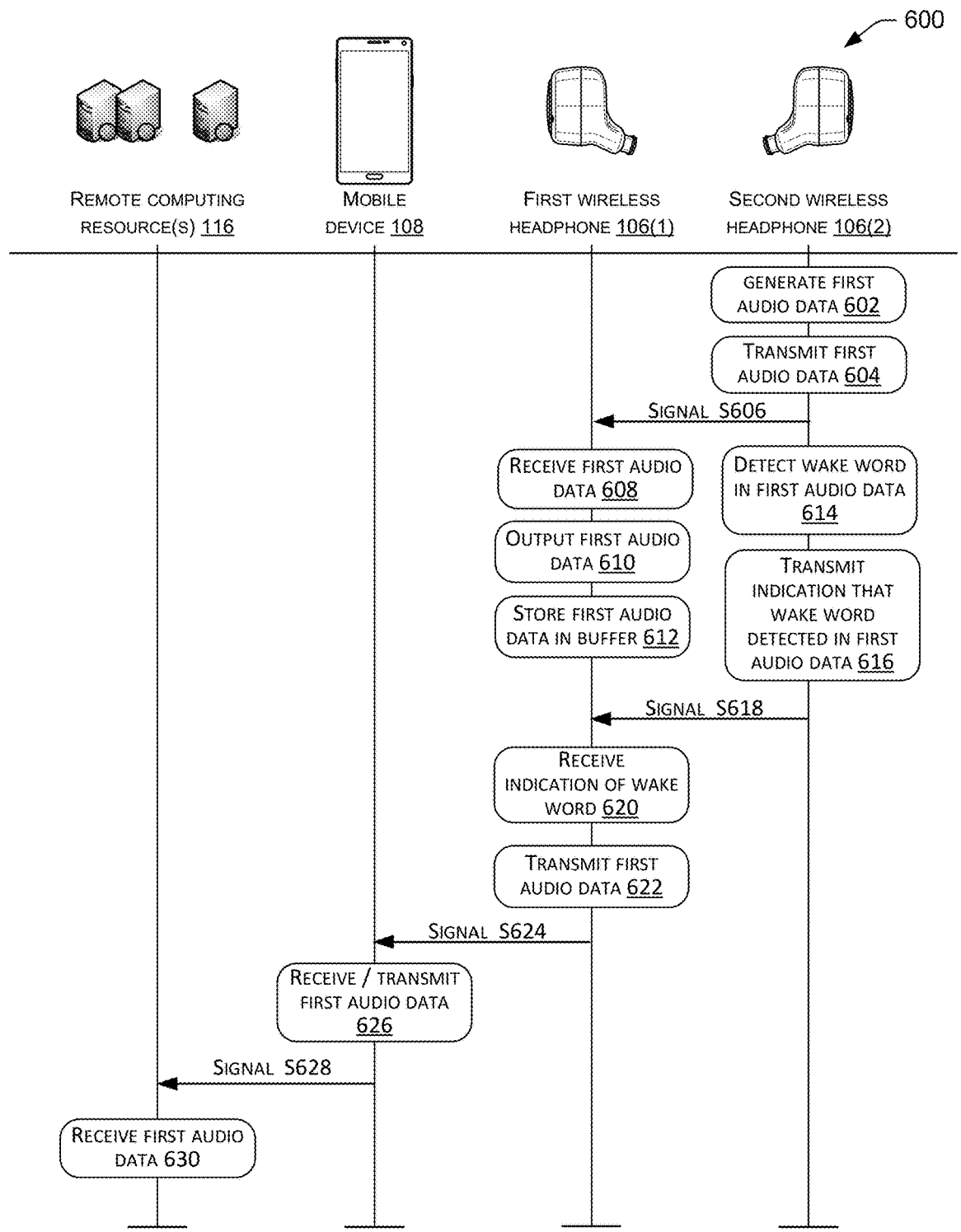
FIG. 6 illustrates an example signal diagram for detecting a wake word within captured audio data and performing speech processing on the audio data.

FIG. 6 illustrates an example process 600 of detecting one or more voice commands at a second wireless headphone 106(2). In some instances, the process 600 may continue from the process 300 once a third communication channel 114 is established between wireless headphones 106 and the wireless headphones 106 are configured as walkie-talkies.

At 602, the second wireless headphone 106(2) may capture audio via one or more microphones 234 and generate corresponding first audio data. At 604, the second wireless headphone 106(2) may transmit the first audio data to a first wireless headphone 106(1) via the third communication channel 114. In some instances, the second wireless headphone 106(2) may transmit a signal S606 to the first wireless headphone 106(1) that includes the first audio data. At 608, the first wireless headphone 106(1) may receive the first audio data and at 610 may output audio associated with the first audio data.

At 612, the first wireless headphone 106(1) may store, at least temporarily, the first audio data in buffer(s) 224.

At 614, the second wireless headphone 106(2) may detect a wake word within the first audio data. For instance, the second wireless headphone 106(2) may perform speech processing on the first audio data using a wake word detection component 250 to determine that the first audio data includes a wake word.

At 616, the second wireless headphone 106(2) may transmit an indication of the detected wake word within the first audio data to the first wireless headphone 106(1) via a second communication channel 112 (e.g., BLE). In some instances, the second wireless headphone 106(2) may transmit the indication based at least in part on detecting the wake word within the first audio data. In some instances, the second wireless headphone 106(2) may transmit a signal S618 to the first wireless headphone 106(1) that includes the indication.

At 620, the first wireless headphone 106(1) may receive an indication of the wake word from the second wireless headphone 106(2).

At 622, the first wireless headphone 106(1) may transmit the first audio data to the mobile device 108. In other words, based at least in part on receiving the indication from the second wireless headphone 106(2), the first wireless headphone 106(1) may transmit the first audio data to the mobile device 108 as a signal S624. In some instances, the first wireless headphone 106(1) may retrieve the first audio data from the buffer(s) 224 when sending the first audio data to the mobile device 108. In other words, the buffer(s) 224 may store the first audio data while the second wireless headphone 106(3) perform speech processing on the first audio data to determine whether a wake word was detected. If so, rather than resending the first audio data to the first wireless headphone 106(1), the second wireless headphone 106(2) may transmit the indication. Accordingly, in some instances, the first wireless headphone 106(1) may store audio data received from the second wireless headphone 106(2) in the buffer(s) 224 while the first wireless headphone 106(1) awaits a receipt of the indication.

Alternatively, in some instances the first wireless headphone 106(1), the mobile device 108, and/or the remote computing resource(s) 116 may performing speech processing on the first audio data to determine whether a wake word exists in the first audio data.

At 626, the mobile device 108 may receive the first audio data and may transmit the first audio data to remote computing resource(s) 116. In some instances, the mobile device 108 may transmit a signal S628 to the remote computing resource(s) 116 that includes the first audio data. At 630, the remote computing resource(s) 116 may receive the first audio data from the mobile device 108.

From 630, the process 600 may perform similar steps as the process 500. For instance, from 630, the process 600 may continue to 534 of the process 500 where the remote computing resource(s) 116 may perform speech processing on the first audio data, determine an intent of verbal command, and cause one or more actions to be performed.

Figure 7B:
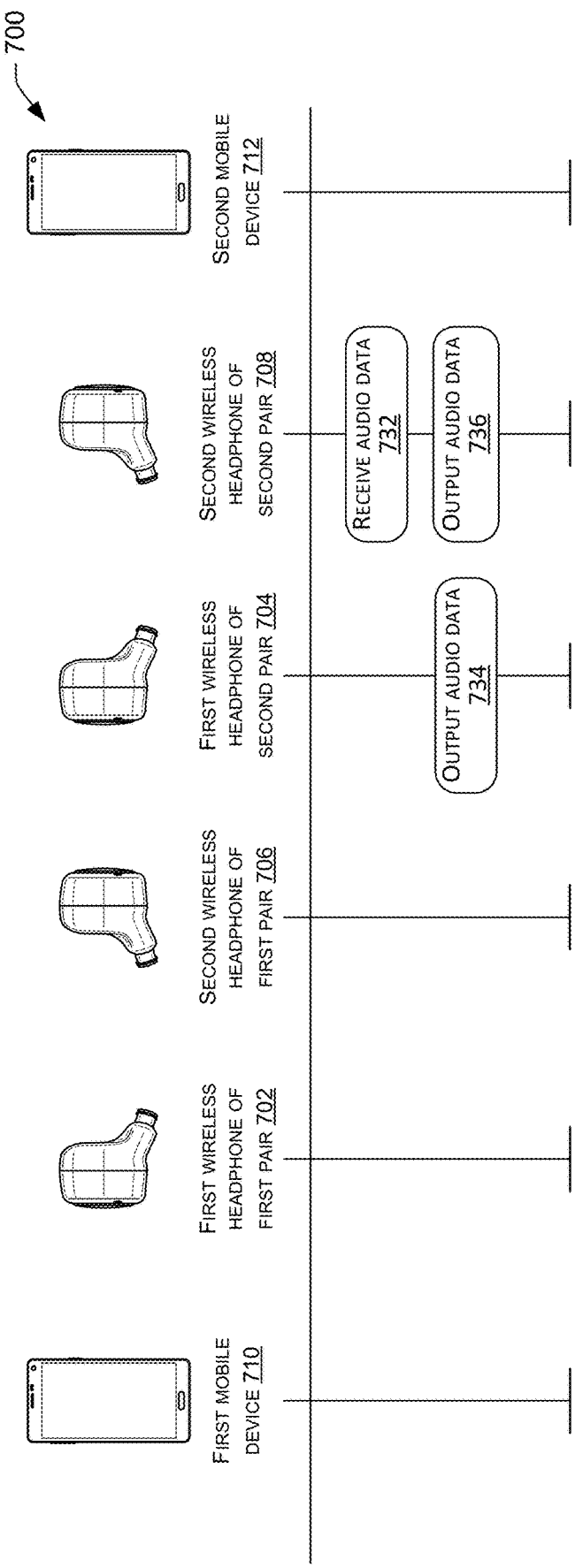
FIG. 7B illustrates an example signal diagram for transmitting audio data between wireless headphones from multiple pairs of wireless headphones.

FIGS. 7A and 7B illustrate an example process 700 for transmitting audio data between different sets or pairs of wireless headphones. For instance, instead of a first user 100 wearing a first wireless headphone 106(1) of the wireless headphones 106, and/or a second user 102 wearing a second wireless headphone 106(2) of the wireless headphones 106, users may have their own pair of wireless headphones. Here, a first wireless headphone 702 of a first pair of wireless headphones may communicate with a first wireless headphone 704 of a second pair of wireless headphones. The first wireless headphone 702 of the first pair may communicatively couple to a second wireless headphone 706 of the first pair via one or more communication channels, such as BLE, NFMI, Bluetooth HFP protocol, etc. Additionally, the first wireless headphone 704 of the second pair may communicatively couple to a second wireless headphone 708 of the second pair via one or more communication channels, such as BLE, NFMI, Bluetooth HFP protocol, etc. Further, the first wireless headphone 702 of the first pair may communicatively couple to a first mobile device 710 and the first wireless headphone 704 of the second pair may communicatively couple to a second mobile device 712. However, in some instances, the first wireless headphone 702 of the first pair may not communicatively couple to the first mobile device 710 and/or the first wireless headphone 704 of the second pair may not communicatively couple to the second mobile device 712.

Beginning with FIG. 7A, at 714 and 716, the first mobile device 710 may respectively establish a connection with the first wireless headphone 702 of the first pair (e.g., first communication channel 110), vice versa, and the second mobile device 712 may establish a connection with the first wireless headphone 704 of the second pair (e.g., first communication channel 110), vice versa. In doing so, the first wireless headphone 702 and the first wireless headphone 704 may respectively couple to one or more remote computing resource(s) 116. However, noted above, the first mobile device 710 and the first wireless headphone 702 of the first pair may not establish a connection. In doing so, the first wireless headphone 702 may not communicatively couple to the one or more remote computing resource(s) 116. Additionally, or alternatively, the second mobile device 712 and the first wireless headphone 704 of the second pair may not establish a connection to communicatively couple the first wireless headphone 704 to the one or more remote computing resource(s) 116.

At 718, the first wireless headphone 702 of the first pair may establish a connection with the first wireless headphone 704 of the second pair. For instance, at least one of the first wireless headphone 702 or the first wireless headphone 704 may detect a verbal command to configure the first pair of headphones and the second pair of headphones are walkie-talkies. As discussed previously, configuring wireless headphones as walkie-talkies may include establishing a third communication channel 114. In instances where the wireless headphones are from different pairs of wireless headphones, the first wireless headphone 702 of the first pair may establish the third communication channel 114 with the first wireless headphone 704 of the second pair.

At 720, the first wireless headphone 702 may capture audio and generate corresponding audio data. At 722, the first wireless headphone 702 may transmit the audio data to the first wireless headphone 704 via the third communication channel 114. In some instances, the first wireless headphone 702 may transmit a signal S724 to the first wireless headphone 704 that includes the audio data.

At 726, the first wireless headphone 704 may receive the audio data and at 728 may transmit the audio data to the second wireless headphone 708, which may include transmitting a signal S730 that includes the audio data.

Continuing to FIG. 7B, at 732, the second wireless headphone 708 may receive the audio data. At 734 and 736, the first wireless headphone 704 and the second wireless headphone 708 may respectively output audio associated with the audio data. In some instances, the audio data may be substantially simultaneously output at the first wireless headphone 704 and the second wireless headphone 708.

FIGS. 7A and 7B illustrate just one example of how audio data may be transmitted between different pairs of wireless headphones. However, each pair of wireless headphones discussed in FIGS. 7A and 7B may include similar components as the wireless headphones 106 discussed hereinabove. For instance, the first wireless headphone 702 of the first pair, the first wireless headphone 704 of the second pair, the second wireless headphone 706 of the first pair, and the second wireless headphone 708 of the second pair may include wake word components to detect wake words issued by a user. Using the communication channels, audio data or other indications (e.g., wake word) may be transmitted between the first wireless headphone 702 of the first pair, the first wireless headphone 704 of the second pair, the second wireless headphone 706 of the first pair, and the second wireless headphone 708 of the second pair. In some instances, the audio data associated with the wake words and/or verbal commands may be transmitted to the remote computing resource(s) 116 for speech processing.

Additionally, to locate or communicatively couple the first pair of wireless headphones and the second pair of wireless headphones, a user may interface with the first mobile device 710 or the second mobile device 712, respectively.

Figure 8:
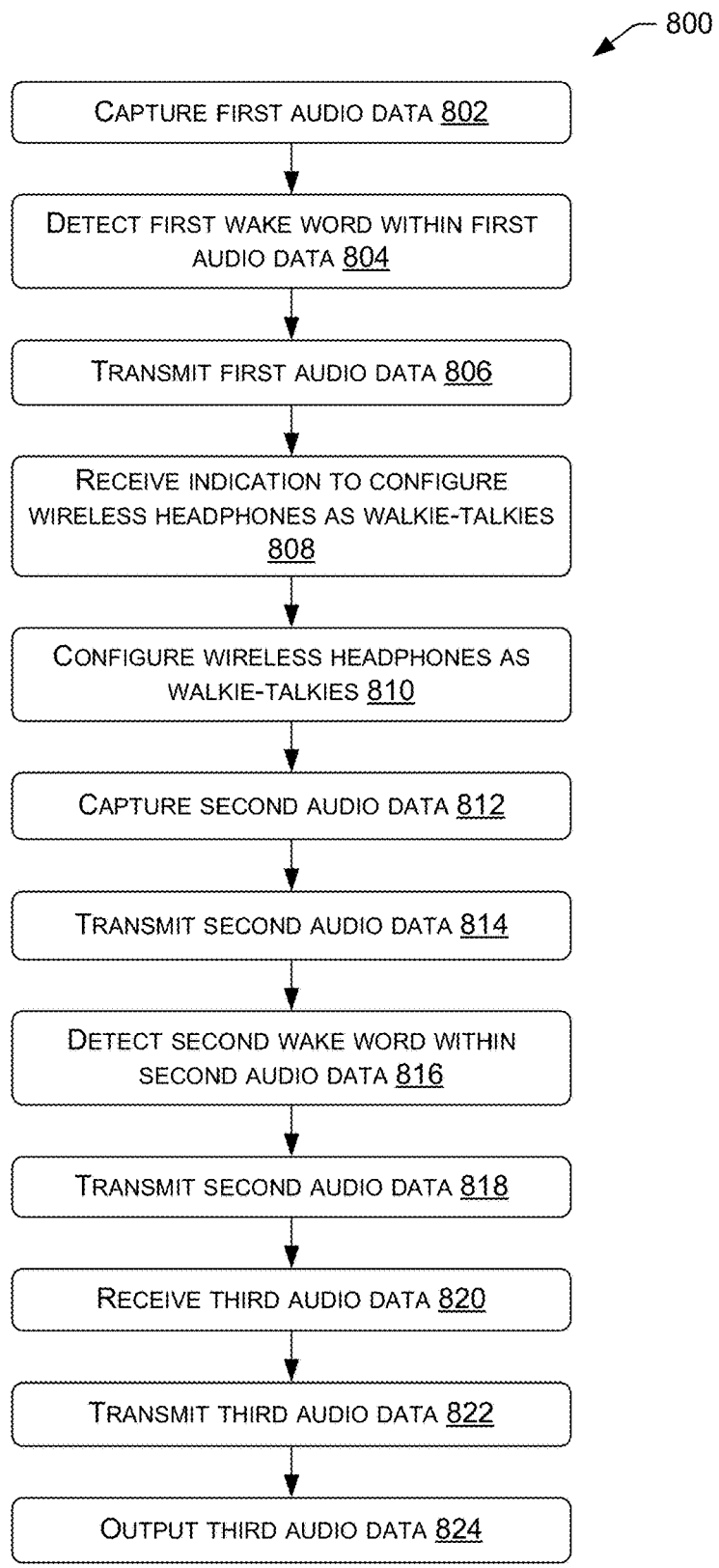
FIGS. 8 and 9 illustrate respective flow diagrams of example processes relating to configuring and utilizing the wireless headphones as walkie-talkies.

FIG. 8 illustrates an example process 800 for utilizing wireless headphones 106 as walkie-talkies. At 802, the process 800 may capture first audio data representing a user command. For instance, a first wireless headphone 106(1) may capture audio via one or more microphones and generate corresponding first audio data. In some instances, the audio may relate to a first user 100 requesting that the wireless headphones 106 configure as walkie-talkies. For instance, the first user 100 may issue a command such as "configure wireless headphones as walkie-talkies."

At 804, the process 800 may detect a first wake word within the first audio data. For instance, the first wireless headphone 106(1) may include speech-processing components, such as a wake word component 206, that detects a predetermined wake word (e.g., walkie-talkie).

At 806, the process 800 may transmit the first audio data. For instance, the first wireless headphone 106(1), upon detecting the wake word, may transmit the first audio data associated with the verbal command to a mobile device 108 communicatively coupled to the first wireless headphone 106(1) and via a first communication channel 110. In some instances, the mobile device 108 may transmit the first audio data to one or more remote computing resource(s) 116 for speech processing to determine an intent of the verbal command.

At 808, the process 800 may receive an indication to configure the wireless headphones 106 as walkie-talkies. For instance, the first wireless headphone 106(1) may receive an indication from the mobile device 108.

At 810, the process 800 may configure the wireless headphones 106 as walkie-talkies. For instance, after transmitting the first audio data, the first wireless headphone 106(1) may receive an indication that verbal command was associated with a command to configure the wireless headphones 106 as walkie-talkies. In some instances, configuring the wireless headphones 106 as walkie-talkies may involve establishing a third communication channel 114 between the first wireless headphone 106(1) and the second wireless headphone 106(2).

At 812, the process 800 may receive second audio data. For instance, the first wireless headphone 106(1) may capture second audio via one or more microphones and generate corresponding second audio data. In other words, after establishing the third communication channel 114 and configuring the wireless headphones 106 as walkie-talkies, the first user 100 wearing the first wireless headphone 106(1) may initiate a conversation with a second user 102 wearing the second wireless headphone 106(2).

At 814, the process 800 may transmit the second audio data. For instance, the first wireless headphone 106(1) may transmit the second audio data to the second wireless headphone 106(2) via the third communication channel 114.

At 816, the process 800 may detect a second wake word within the second audio data. For instance, the first wireless headphone 106(1) may detect a wake word within the second audio data by performing speech processing on the second audio data and determining that the second audio data includes the second wake word. For instance, the first user 100 wearing the first wireless headphone 106(1) issue a verbal command including a trigger expression or wake word (e.g., "awake," "Alexa," etc.), which may be followed by instructions or directives (e.g., "what is the weather," "how may ounces are in a cup," etc.). In other words, the second audio data may represent a verbal command issued by the first user 100.

At 818, the process 800 may transmit the second audio data. For instance, the first wireless headphone 106(1) may transmit the second audio data to the mobile device 108 via the first communication channel 110 based at least in part on detecting the second wake word within the second audio data. In some instances, the mobile device 108 may transmit the second audio data to the remote computing resource(s) 116 to determine an intent or action to be performed in response to the verbal command.

At 820, the process 800 may receive third audio data. For instance, the first wireless headphone 106(1) may receive third audio data from the mobile device 108 that represents a response to the verbal command of the first user 100.

At 822, the process 800 may transmit the third audio data. For instance, the first wireless headphone 106(1) may transmit the third audio data to the second wireless headphone 106(2) via the third communication channel 114.

At 824, the process 800 may output the third audio data. For instance, the first wireless headphone 106(1) may output audio associated with the third audio data.

Figure 9:
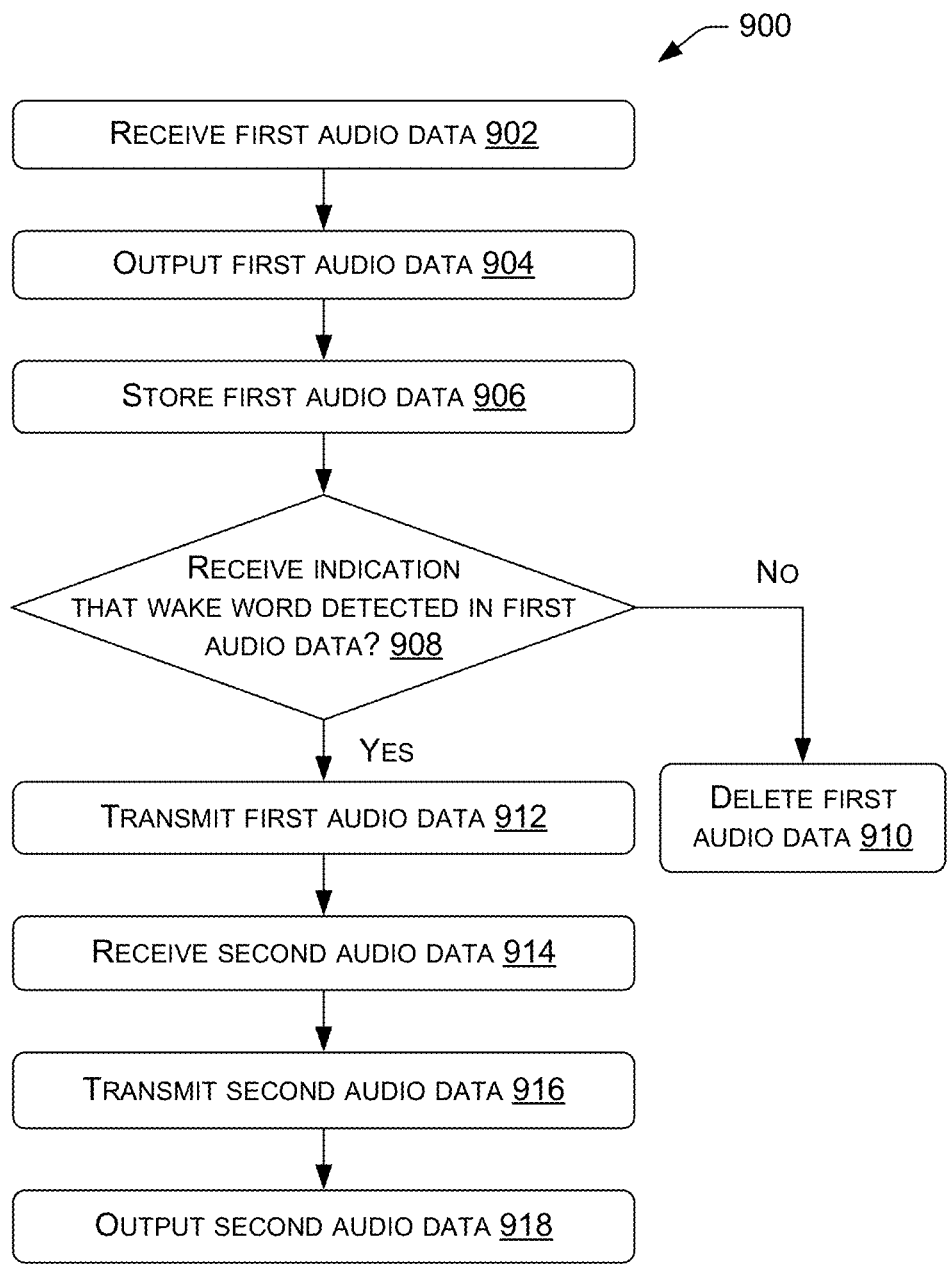

FIG. 9 illustrates an example process 900 for utilizing wireless headphones 106 as walkie-talkies. In some instances, the process 900 may begin once a third communication channel 114 is established between wireless headphones 106 and the wireless headphones 106 are configured as walkie-talkies.

At 902, the process 900 may receive first audio data. For instance, the first wireless headphone 106(1) may receive the first audio data from the second wireless headphone 106(2) via the third communication channel 114.

At 904 the process 900 may output the first audio data. For instance, the first wireless headphone 106(1) may output audio associated with the first audio data via one or more speakers of the first wireless headphone 106(1).

At 906, the process 900 may store the first audio data. For instance, the first wireless headphone 106(1) may store, at least temporarily, the first audio data in buffer(s) 224.

At 908, the process 900 may determine whether an indication was received indicating that a wake word was detected in the first audio data. For instance, the first wireless headphone 106(1) may determine whether an indication was received that a wake word was detected in the first audio data. In some instances, the first wireless headphone 106(1) may receive the indication from the second wireless headphone 106(2) via a second communication channel 112.

Following a "No" from 908, the process 900 may proceed to 910, where the process 900 may delete the first audio data. For instance, if the first wireless headphone 106(1) did not receive the indication, the first wireless headphone 106(1) may delete or otherwise remove the first audio data from the buffer(s) 224 of the first wireless headphone 106(1).

Following a "Yes" from 908, the process 900 may proceed to 912 to transmit the first audio data. For instance, the first wireless headphone 106(1) may transmit the first audio data to the mobile device 108 via the first communication channel 110.

At 914, the process 900 may receive second audio data. For instance, the first wireless headphone 106(1) may receive second audio data from the mobile device 108.

At 916, the process 900 may transmit the second audio data. For instance, the first wireless headphone 106(1) may transmit the second audio data to the second wireless headphone 106(2) via the third communication channel 114.

At 918, the process 900 may output the second audio data. For instance, the first wireless headphone 106(1) may output audio associated with the second audio data.

CONCLUSION

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
establishing, by a first wireless audio device and using a first wireless technology, a first communication channel with an electronic device;
establishing, by the first wireless audio device and using a second wireless technology different than the first wireless technology, a second communication channel with a second wireless audio device;
receiving, by the first wireless audio device, an indication associated with establishing a third communication channel with the second wireless audio device; and
establishing, by the first wireless audio device and using a third communication technology different than the second wireless technology, the third communication channel with the second wireless audio device, the third communication channel being separate from the second communication channel.

2. The method of claim 1, wherein the indication comprises:
a first user utterance received by the first wireless audio device; or
a second user utterance received at the second wireless audio device.

3. The method of claim 1, wherein the indication comprises:
a first touch input received at the first wireless audio device; or
a second touch input received at the second wireless audio device.

4. The method of claim 1, further comprising terminating the second communication channel, and wherein establishing the third communication channel is further based at least in part on terminating the second communication channel.

5. The method of claim 1, further comprising:
receiving, by the first wireless audio device, audio data corresponding to a user utterance; and
transmitting, by the first wireless audio device, the audio data to the second wireless audio device via the third communication channel.

6. The method of claim 1, further comprising:
receiving, by the first wireless audio device, first data corresponding to a command;
transmitting at least a first portion of the first data to the electronic device via the first communication channel;
receiving, by the first wireless audio device and from the electronic device, second data; and
at least one of:
causing, by the first wireless audio device, output of a second portion of the second data, or
transmitting, by the first wireless audio device to the second wireless audio device via the third communication channel, the second portion of the second data.

7. The method of claim 1, further comprising determining at least one of:
a packet error rate (PER) value associated with data transmission between the first wireless audio device and the second wireless audio device over the second communication channel, or
a received signal strength indicator (RSSI) value associated with the second communication channel,
wherein establishing the third communication channel is based at least in part on the at least one of the PER value or the RSSI value.

8. A first wireless audio device comprising:
at least one processor; and
one or more non-transitory computer-readable media store computer-executable instructions that, when executed by the at least one processor, cause the at least one processor to perform acts comprising:
establishing a first communication channel with a mobile device,
establishing a second communication channel with a second wireless audio device,
receiving an indication associated with establishing a third communication channel with the second wireless audio device,
sending, via the second communication channel to the second wireless audio device, an instruction to establish the third communication channel with the first wireless audio device, and
establishing the third communication channel with the second wireless audio device, the third communication channel being separate from the second communication channel.

9. The first wireless audio device of claim 8, further comprising a microphone, and wherein the indication represents a voice command captured by the microphone.

10. The first wireless audio device of claim 9, the acts further comprising determining that the voice command includes a predefined wake word.

11. The first wireless audio device of claim 8, further comprising a touch-sensitive interface, and wherein the indication represents a touch input received by the touch-sensitive interface.

12. The first wireless audio device of claim 8, wherein:
the indication is received by the first wireless audio device from the second wireless audio device via the second communication channel; and
the indication represents a touch input received by a touch-sensitive interface of the second wireless audio device or a voice command received by a microphone of the second wireless audio device.

13. The first wireless audio device of claim 9, the acts further comprising:
determining one of:
a packet error rate (PER) value associated with data transmission between the first wireless audio device and the second wireless audio device over the second communication channel, or
a received signal strength indicator (RSSI) value associated with the second communication channel; and
terminating, based at least in part on one of the PER value or the RSSI value, the second communication channel.

14. The first wireless audio device of claim 8, wherein the indication comprises a first indication, the acts further comprising:
receiving a second indication associated with terminating the third communication channel with the second wireless audio device; and
terminating the third communication channel with the second wireless audio device.

15. The first wireless audio device of claim 14, wherein:
the second communication channel is established between a first network interface of the first wireless audio device and a second network interface of the second wireless audio device;
the third communication channel is established between a third network interface of the first wireless audio device and a fourth network interface of the second wireless audio device; and
the acts further comprise establishing a fourth communication channel with the second wireless audio device, the fourth communication channel being established between the first network interface of the first wireless audio device and the second network interface of the second wireless audio device.

16. The first wireless audio device of claim 8, the acts further comprising:
determining a signal strength associated with the third communication channel;
determining that the signal strength is less than a threshold; and
causing, based at least in part on the signal strength being less than the threshold, output of audio data.

17. A method comprising:
establishing, by a first wireless audio device, a first communication channel with an electronic device;
establishing, by the first wireless audio device, a second communication channel with a second wireless audio device;
receiving, by the first wireless audio device from the electronic device via the first communication channel, data;
causing, by the first wireless audio device, output of the data;
transmitting, by the first wireless audio device to the second wireless audio device, the data for output on the second wireless audio device;
receiving, by the first wireless audio device, audio data associated with a user utterance;
determining that the audio data contains a predefined wake word;
determining, based at least in part on the audio data containing the predefined wake word, that an intent of the user utterance is associated with establishing a third communication channel with the second wireless audio device; and
establishing, by the first wireless audio device, the third communication channel with the second wireless audio device, the third communication channel being separate from the second communication channel.

18. The method of claim 17, further comprising terminating the second communication channel, wherein terminating the second communication channel is based at least in part on one of:
receiving the audio data;
establishing the third communication channel;
a packet error rate (PER) value associated with data transmission between the first wireless audio device and the second wireless audio device over the second communication channel, or
a received signal strength indicator (RSSI) value associated with the second communication channel.

19. The method of claim 17, further comprising:
receiving, by the first wireless audio device and from the second wireless audio device via the third communication channel, second audio data representing a second user utterance;
outputting, via a loudspeaker at the first wireless audio device, audio associated with the second audio data;
transmitting at least a portion of the second audio data to the electronic device via the first communication channel;
receiving second data at the first wireless audio device from the electronic device via the first communication channel; and
transmitting the second data to the second wireless audio device via the third communication channel.

20. The method of claim 17, wherein establishing the first communication channel between the first wireless audio device and the electronic device is based at least in part on at least one of:
the first wireless audio device being located closer to the electronic device than the second wireless audio device; or
a first signal strength between the first wireless audio device and the electronic device being greater than a second signal strength between the second wireless audio device and the electronic device.

* * * * *